(12) United States Patent
Lui

(10) Patent No.: US 11,905,652 B2
(45) Date of Patent: Feb. 20, 2024

(54) COMPOSITE MATERIAL AND CARPET COMPOSITION COMPRISING SAME

(71) Applicant: Columbia Insurance Company, Omaha, NE (US)

(72) Inventor: Kam C. Lui, Kennesaw, GA (US)

(73) Assignee: Columbia Insurance Company, Omaha, NE (US)

( * ) Notice: Subject to any disclaimer, the term of this patent is extended or adjusted under 35 U.S.C. 154(b) by 0 days.

(21) Appl. No.: 17/358,546

(22) Filed: Jun. 25, 2021

(65) Prior Publication Data

US 2021/0401209 A1    Dec. 30, 2021

Related U.S. Application Data

(60) Provisional application No. 63/044,467, filed on Jun. 26, 2020.

(51) Int. Cl.
*A47G 27/02* (2006.01)
*D06N 7/00* (2006.01)
*B32B 5/02* (2006.01)
*B32B 27/12* (2006.01)
*B32B 27/32* (2006.01)
(Continued)

(52) U.S. Cl.
CPC ........... *D06N 7/0068* (2013.01); *A47G 27/02* (2013.01); *B32B 5/022* (2013.01); *B32B 27/02* (2013.01); *B32B 27/08* (2013.01); *B32B 27/12* (2013.01); *B32B 27/32* (2013.01); *B32B 27/34* (2013.01); *D05C 17/023* (2013.01); *D06N 7/0081* (2013.01); *B32B 2250/03* (2013.01); *B32B 2250/04* (2013.01); *B32B 2250/40* (2013.01); *B32B 2250/42* (2013.01); *B32B 2270/00* (2013.01); *B32B 2471/02* (2013.01); *D06N 2211/066* (2013.01); *D10B 2503/042* (2013.01); *Y10T 428/23979* (2015.04)

(58) Field of Classification Search
CPC ....... B32B 5/022; B32B 5/2702; B32B 27/08; B32B 27/12; B32B 27/32; B32B 27/302; B32B 27/34; B32B 27/36; B32B 2270/00; B32B 2250/03; B32B 2250/04; B32B 2250/40; B32B 2250/42; D06N 7/0068; D06N 7/0081; D06N 2211/066; D10B 2503/042; Y10T 428/23979; D05C 17/023
See application file for complete search history.

(56) References Cited

U.S. PATENT DOCUMENTS

2002/0071944 A1\*  6/2002  Gardner ................. B32B 27/12
                                                  428/196
2006/0247388 A1    11/2006  Hale et al.
(Continued)

OTHER PUBLICATIONS

International Search Report and Written Opinion were dated Oct. 18, 2021 by the International Searching Authority for International Application No. PCT/US2021/039089 filed on Jun. 25, 2021 and published as WO 2021/263104 (Applicant—Shaw Industries Group, Inc.) (21 pages).

*Primary Examiner* — Cheryl Juska
(74) *Attorney, Agent, or Firm* — Ballard Spahr LLP

(57) ABSTRACT

Disclosed is composite comprising four layers, two of the layers is a polymer film and two of the layers are non-woven materials, that is suitable for use as a primary backing material and/or a secondary backing material in the manufacture of textile carpet compositions. Also disclosed is a method for making the disclosed composite.

24 Claims, 5 Drawing Sheets

(51) Int. Cl.
  *B32B 27/34* (2006.01)
  *B32B 27/08* (2006.01)
  *D05C 17/02* (2006.01)
  *B32B 27/02* (2006.01)

(56) References Cited

U.S. PATENT DOCUMENTS

| | | |
|---|---|---|
| 2012/0328842 A1* | 12/2012 | Afshari .................. C08L 23/10 |
| | | 427/172 |
| 2014/0087124 A1 | 3/2014 | Carbajal |
| 2016/0144605 A1 | 5/2016 | Jenkins et al. |
| 2018/0355553 A1 | 12/2018 | Coon |
| 2019/0352845 A1 | 11/2019 | Coon et al. |
| 2019/0366627 A1 | 12/2019 | Albor et al. |

* cited by examiner

COMPOSITE MATERIAL AND CARPET COMPOSITION COMPRISING SAME

CROSS-REFERENCE TO RELATED APPLICATIONS

This application claims the benefit of U.S. Provisional Application No. 63/044,467 filed Jun. 26, 2020, which is incorporated herein by reference in its entirety.

FIELD OF THE INVENTION

The present invention relates to the field of textile carpet compositions and more particularly to a composite material suitable for use as a backing component, for example as a primary backing component, in the manufacture of same.

BACKGROUND OF THE INVENTION

Conventional carpets are commonly fabricated by tufting procedures, where yarns are tufted through a primary backing material. Commonly used primary backings, in the carpet industry, are generally made from the woven materials. However, manufacturing of such woven backings is expensive, as it requires both expensive equipment and skilled labor force that is trained to weave the backings. Additionally, to fabricate a woven material during the weaving process, one requires use of a warp that is manufactured in a separate manufacturing process using a different equipment. While in some instances, the warp can be manufactured from a creel located behind the weaving equipment, its production still requires a separate manufacturing step that makes the whole weaving process complicated and inefficient. In certain instances, the combination of woven and nonwoven materials can be used to form needled backings and non-woven backings. Such processes, however, are also expensive, as they require first, forming woven materials on weaving machines over 12' at slow output speeds since weft insertion speeds for wide width weaving are below 2,500 meters/min, and then attaching a non-woven or a bonding fiber to the formed woven materials during a second processing step. Use of the non-woven materials alone, as backings, is not common in the carpet industry, as the non-woven materials are known to be hard to repair if a mistake is made during the tufting.

Therefore, there remains a need for materials, such as composite materials, that can be both easily and inexpensively manufactured, to serve as a backing material, such as a primary backings in tufted carpets. Further, there remains a need for methods of making carpets containing such composite materials.

SUMMARY OF THE INVENTION

The present invention is directed generally to a composite that is suitable to be used in as a backing material in the manufacture of textile carpet compositions. Accordingly, in a first aspect, disclosed and described herein is a composite. The composite is suitable for use as a primary backing and/or a secondary backing in a carpet composition. For example, the disclosed composite is suitable for use as a primary backing. In another example, the disclosed composite is suitable for use as a secondary backing.

The disclosed composite comprising at least four layers, as follows: a first layer being a continuous or a non-continuous first polymer film having a face side and a back side, wherein the first polymer film comprises a first polymer blend comprising a first polymer and a second polymer, wherein the first polymer is immiscible in the second polymer. A second layer being a first non-woven fabric having a face side and a back side, wherein the face side of the first non-woven fabric contacts the back side of the first polymer film. A third layer being a continuous or a non-continuous second polymer film having a face side and a back side, wherein the second polymer film comprises a second polymer blend comprising a third polymer and a fourth polymer, wherein the third polymer is immiscible in the fourth polymer, wherein the face side of the second polymer film contacts the back side of the first non-woven fabric. A fourth layer being a second non-woven fabric having a face side and a back side, wherein the face side of the second non-woven fabric contacts the back side of the second polymer film. As such, the composite comprises at least four layers.

Also disclosed herein is a composite comprising at least four layers, as follows: a first layer being a continuous or a non-continuous first polymer film having a face side and a back side, wherein the first polymer film comprises a first polymer blend comprising a first polymer and a second polymer, wherein the first polymer is immiscible in the second polymer. A second layer being a first non-woven fabric having a face side and a back side. A third layer being a continuous or a non-continuous second polymer film having a face side and a back side, wherein the second polymer film comprises a second polymer blend comprising a third polymer and a fourth polymer, wherein the third polymer is immiscible in the fourth polymer. A fourth layer being a second non-woven fabric having a face side and a back side. The at least four layers can be arranged in any order.

Also disclosed herein is a composite comprising: a first layer being a continuous or a non-continuous first polymer film having a face side and a back side, wherein the first polymer film comprises a first polymer blend comprising a first polymer and a second polymer, wherein the first polymer is immiscible in the second polymer. A second layer being a first non-woven fabric having a face side and a back side. A third layer being a continuous or a non-continuous second polymer film having a face side and a back side, wherein the second polymer film comprises a second polymer blend comprising a third polymer and a fourth polymer, wherein the third polymer is immiscible in the fourth polymer. The three layers can be arranged in any order.

Also disclosed is a greige good comprising: a) a primary backing material having a face side and a back side. The primary backing material comprises: i) a continuous or a non-continuous first polymer film having a face side and a back side, wherein the first polymer film comprises a first polymer blend comprising a first polymer and a second polymer, wherein the first polymer is immiscible in the second polymer; and ii) a continuous or a non-continuous second polymer film having a face side and a back side, wherein the second polymer film comprises a second polymer blend comprising a third polymer and a fourth polymer, wherein the third polymer is immiscible in the fourth polymer, wherein the face side of the second polymer film contacts the back side of the first polymer film; wherein first polymer film is an extruded film and the second polymer film is an extruded film, wherein the first polymer film and the second polymer film are extruded in a transverse direction. The greige good also comprises: b) a plurality of fibers attached to the primary backing material, at least a portion of said plurality of fibers extending from the face side of the primary backing material to form a face pile.

In a further aspect, a method is provided for making the composite described herein.

In a further aspect, disclosed herein is a textile carpet composition comprising composite described herein.

In a further aspect, disclosed herein is a greige good comprising composite described herein.

In still a further aspect, a method for making the disclosed carpet compositions is provided.

Additional aspects of the invention will be set forth, in part, in the detailed description, and claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

FIG. 1A shows the face-side of the composite with the tufted yarn. FIG. 1B shows the back-side of the composite with the tufted yarn.

FIG. 2A shows the face-side of the composite with the tufted yarn. FIG. 2B shows the back-side of the composite with the tufted yarn.

DETAILED DESCRIPTION OF THE INVENTION

Figure 1A:
FIGS. 1A and 1B show yarn tufted into a non-limiting composite disclosed herein.

The present invention can be understood more readily by reference to the following detailed description, examples, drawings, and claims, and their previous and following description. However, before the present compositions, articles, devices, systems, and/or methods are disclosed and described, it is to be understood that this invention is not limited to the specific compositions, articles, devices, systems, and/or methods disclosed unless otherwise specified, as such can, of course, vary. It is also to be understood that the terminology used herein is for the purpose of describing particular aspects only and is not intended to be limiting.

The following description of the invention is also provided as an enabling teaching of the invention in its best, currently known aspect. To this end, those of ordinary skill in the relevant art will recognize and appreciate that changes and modifications can be made to the various aspects of the invention described herein, while still obtaining the beneficial results of the present invention. It will also be apparent that some of the desired benefits of the present invention can be obtained by selecting some of the features of the present invention without utilizing other features. Accordingly, those of ordinary skill in the relevant art will recognize that many modifications and adaptations to the present invention are possible and can even be desirable in certain circumstances and are thus also a part of the present invention. Thus, the following description is provided as illustrative of the principles of the present invention and not in limitation thereof.

Various combinations of elements of this disclosure are encompassed by this invention, e.g. combinations of elements from dependent claims that depend upon the same independent claim.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

All publications mentioned herein are incorporated herein by reference to disclose and describe the methods and/or materials in connection with which the publications are cited.

It is also to be understood that the terminology used herein is for the purpose of describing particular aspects only and is not intended to be limiting. As used in the specification and in the claims, the term "comprising" may include the aspects "consisting of" and "consisting essentially of." Unless defined otherwise, all technical and scientific terms used herein have the same meaning as commonly understood by one of ordinary skill in the art to which this invention belongs. In this specification and in the claims which follow, reference will be made to a number of terms which shall be defined herein.

As used herein, the singular forms "a," "an" and "the" include plural referents unless the context clearly dictates otherwise. Thus, for example, reference to a "polymer" includes aspects having two or more polymers unless the context clearly indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "optional" or "optionally" mean that the subsequently described event or circumstance may or may not occur, and that the description includes instances where said event or circumstance occurs and instances where it does not.

"Carpet composition" as used herein includes various structures or forms of carpet floor coverings. For example, and without limitation, the term "carpet composition" includes greige goods, carpet tiles, broadloom carpet, area rugs, and synthetic turfs. To that end, a "broadloom carpet" means a broadloom textile flooring product manufactured in roll form.

The definition of carpet composition herein does not include products that would be known to one of ordinary skill in the art as "resilient flooring." As an example, products that fall under the category of resilient flooring include, but are not limited to, linoleum, vinyl tiles, cork tiles, rubber tiles and floor mats.

As used herein, the term "by weight," when used in conjunction with a component, unless specially stated to the contrary is based on the total weight of the formulation or composition in which the component is included. For example, if a particular element or component in a composition or article is said to have 8% by weight, it is understood that this percentage is in relation to a total compositional percentage of 100%.

A weight percent of a component, or weight %, or wt. %, unless specifically stated to the contrary, is based on the total weight of the formulation or composition in which the component is included.

References in the specification and concluding claims to parts by weight of a particular element or component in a composition or article, denotes the weight relationship between the element or component and any other elements or components in the composition or article for which a part by weight is expressed. Thus, in a composition or a selected portion of a composition containing 2 parts by weight of component X and 5 parts by weight component Y, X and Y are present at a weight ratio of 2:5, and are present in such ratio regardless of whether additional components are contained in the composition.

In some instances, the parts per weight of a component is based on the weight of the composition "on a dry basis," and thus, refers to "dry parts," which indicates the parts per weight of the composition without water or any other liquid or fluid.

In other instances, the parts per weight of a component is based on the weight of the composition "on a wet basis," and thus, refers to "wet parts," which indicates the parts per weight of the composition in the presence of water or any other liquid or fluid as defined.

The term "fiber" as used herein includes fibers of extreme or indefinite length (i.e. filaments) and fibers of short length (i.e., staple fibers).

The term "yarn" as used herein refers to a continuous strand or bundle of fibers.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

A. Composite Suitable for Primary and/or Secondary Backing

As summarized above, the present invention is directed, in part, to a composite. The composite is suitable and can be used as a primary backing component in the manufacture of a carpet composition. As disclosed herein the present invention is also directed, in part, to the use of the composite as a primary backing component in the manufacture of a carpet composition. The disclosed composite is also suitable to be used as a secondary backing component in a carpet composition.

Disclosed herein is a composite comprising: (a) a continuous or a non-continuous first polymer film having a face side and a back side, wherein the first polymer film comprises a first polymer blend comprising a first polymer and a second polymer, wherein the first polymer is immiscible in the second polymer; (b) a first non-woven fabric having a face side and a back side, wherein the face side of the first non-woven fabric contacts the back side of the first polymer film; (c) a continuous or a non-continuous second polymer film having a face side and a back side, wherein the second polymer film comprises a second polymer blend comprising a third polymer and a fourth polymer, wherein the third polymer is immiscible in the fourth polymer, wherein the face side of the second polymer film contacts the back side of the first non-woven fabric; and (d) a second non-woven fabric having a face side and a back side, wherein the face side of the second non-woven fabric contacts the back side of the second polymer film. As such, the composite comprises at least four layers.

In one aspect, the composite consists of: (a) a continuous or a non-continuous first polymer film having a face side and a back side, wherein the first polymer film comprises a first polymer blend comprising a first polymer and a second polymer, wherein the first polymer is immiscible in the second polymer; (b) a first non-woven fabric having a face side and a back side, wherein the face side of the first non-woven fabric contacts the back side of the first polymer film; (c) a continuous or a non-continuous second polymer film having a face side and a back side, wherein the second polymer film comprises a second polymer blend comprising a third polymer and a fourth polymer, wherein the third polymer is immiscible in the fourth polymer, wherein the face side of the second polymer film contacts the back side of the first non-woven fabric; and (d) a second non-woven fabric having a face side and a back side, wherein the face side of the second non-woven fabric contacts the back side of the second polymer film.

Disclosed herein is a composite comprising: a) a continuous or a non-continuous first polymer film having a face side and a back side, wherein the first polymer film comprises a first polymer blend comprising a first polymer and a second polymer, wherein the first polymer is immiscible in the second polymer; b) a first non-woven fabric having a face side and a back side; c) a continuous or a non-continuous second polymer film having a face side and a back side, wherein the second polymer film comprises a second polymer blend comprising a third polymer and a fourth polymer, wherein the third polymer is immiscible in the fourth polymer; and d) a second non-woven fabric having a face side and a back side. For example, the composite in this aspect can consist of: a) a continuous or a non-continuous first polymer film having a face side and a back side, wherein the first polymer film comprises a first polymer blend comprising a first polymer and a second polymer, wherein the first polymer is immiscible in the second polymer; b) a first non-woven fabric having a face side and a back side; c) a continuous or a non-continuous second polymer film having a face side and a back side, wherein the second polymer film comprises a second polymer blend comprising a third polymer and a fourth polymer, wherein the third polymer is immiscible in the fourth polymer; and d) a second non-woven fabric having a face side and a back side The layers in the composite can be arranged in any order. In one aspect, the face side of the second polymer film contacts the back side of the first polymer film. In another aspect, the face side of the first polymer film contacts the back side of the first non-woven fabric. In yet another aspect, the face side of the second non-woven fabric contacts the back side of the first polymer film. In yet another aspect, the face side of the first non-woven fabric contacts the back side of the second non-woven fabric. In yet another aspect, the face side of the first non-woven fabric contacts the back side of the second polymer film. In yet another aspect, the face side of the second non-woven fabric contacts the back side of the first non-woven fabric. In yet another aspect, the face side of the first non-woven fabric contacts the back side of the first polymer film. In yet another aspect, the face side of the second non-woven fabric contacts the back side of the first non-woven fabric. In yet another aspect, the face side of the second polymer film contacts the back side of the second non-woven fabric. In yet another aspect, the face side of the first polymer film contacts the back side of the first non-woven fabric. In yet another aspect, the face side of the second non-woven fabric contacts the back side of the first polymer film. In yet another aspect, the face side of the second polymer film contacts the back side of the second non-woven fabric.

Also disclosed herein is a composite comprising: a) a continuous or a non-continuous first polymer film having a face side and a back side, wherein the first polymer film comprises a first polymer blend comprising a first polymer and a second polymer, wherein the first polymer is immiscible in the second polymer; b) a first non-woven fabric having a face side and a back side; and c) a continuous or a non-continuous second polymer film having a face side and a back side, wherein the second polymer film comprises a second polymer blend comprising a third polymer and a fourth polymer, wherein the third polymer is immiscible in the fourth polymer. For example, the composite can consist of a) a continuous or a non-continuous first polymer film having a face side and a back side, wherein the first polymer film comprises a first polymer blend comprising a first polymer and a second polymer, wherein the first polymer is immiscible in the second polymer; b) a first non-woven fabric having a face side and a back side; and c) a continuous or a non-continuous second polymer film having a face side and a back side, wherein the second polymer film comprises a second polymer blend comprising a third polymer and a fourth polymer, wherein the third polymer is immiscible in the fourth polymer. The layers in the composite can be arranged in any order. In one aspect, the face side of the second polymer film contacts the back side of the first polymer film. In another aspect, the face side of the first polymer film contacts the back side of the first non-woven fabric. In yet another aspect, the face side of the first non-woven fabric contacts the back side of the second polymer film. In yet another aspect, the face side of the first non-woven fabric contacts the back side of the first polymer film. In yet another aspect, the face side of the second polymer film contacts the back side of the first non-woven fabric.

In one aspect, the composite can have a face side and a back side, wherein the face side of the composite is the face side of the first polymer film, and wherein the back side of the composite is the back side of the second non-woven fabric.

In one aspect, the composite is a laminated composite.

A continuous or a non-continuous first polymer film comprising a polymer, such as a first polymer, being immiscible in another polymer, such as a second polymer, means that there is a phase separation between the polymers in the first polymer film. Similarly, a continuous or a non-continuous second polymer film comprising a polymer, such as a third polymer, being immiscible in another polymer, such as a fourth polymer, means that there is a phase separation between the polymers in the second polymer film.

A continuous first or second polymer film is a conventional polymer film in the sense of that there are no intentional physical alterations, such as delamination or holes, in the continuous film. A non-continuous first or second polymer film is a polymer film that has been physically altered to, for example, contain delamination or holes. For example, a non-continuous first or second polymer film can be made by processing a continuous polymer film with high-pressure water jetting to cause delamination in the continuous film. The non-continuous first or second polymer film can be a fibrous film.

In one aspect, the composite comprises a continuous first polymer film. In another aspect, the composite comprises a continuous second polymer film. In yet another aspect, the composite comprises a continuous first polymer film and a continuous second polymer film. In yet another aspect, the composite comprises a non-continuous first polymer film. In yet another aspect, the composite comprises a non-continuous second polymer film. In yet another aspect, the composite comprises a non-continuous first polymer film and a non-continuous second polymer film. In yet another aspect, the composite comprises a non-continuous first polymer film and a continuous second film. In yet another aspect, the composite comprises a continuous first polymer film and a non-continuous second polymer film.

In one aspect, the continuous or non-continuous first polymer film is an extruded film. In one aspect, the continuous or non-continuous second polymer film is an extruded film. In one aspect, the continuous or non-continuous first polymer film is an extruded film and the continuous or non-continuous second polymer film is an extruded film.

In one aspect, the continuous or non-continuous first polymer film is an extruded film and the continuous or non-continuous second polymer film is an extruded film, wherein the continuous or non-continuous first polymer film and the continuous or non-continuous second polymer film are extruded in the same direction. For example, both the continuous or non-continuous first polymer film and the continuous or non-continuous second polymer film can be extruded in the machine direction.

In one aspect, the continuous or non-continuous first polymer film is an extruded film and the continuous or non-continuous second polymer film is an extruded film, wherein the continuous or non-continuous first polymer film and the continuous or non-continuous second polymer film are extruded in the transverse direction. For example, the continuous or non-continuous first polymer film can be extruded in the machine direction and the continuous or non-continuous second polymer film can be extruded in the cross direction.

In one aspect, the continuous or non-continuous first polymer film is a stretched film and the continuous or non-continuous second polymer film is a stretched film, wherein the continuous or non-continuous first polymer film and the continuous or non-continuous second polymer film are stretched in the same direction. For example, both the continuous or non-continuous first polymer film and the continuous or non-continuous second polymer film can be stretched in the machine direction.

In one aspect, the continuous or non-continuous first polymer film is a stretched film and the continuous or non-continuous second polymer film is a stretched film, wherein the continuous or non-continuous first polymer film and the continuous or non-continuous second polymer film are stretched in the transverse direction. For example, the continuous or non-continuous first polymer film can be stretched in the machine direction and the continuous or non-continuous second polymer film can be stretched in the cross direction.

For example, the continuous or non-continuous first polymer film and/or continuous or non-continuous second polymer film can be stretched between 2× to 10×, or from 3× to 7×, or from 4× to 6×, as compared to its original dimension over a defined length if no stretching would occur.

In one aspect, the first polymer blend and the second polymer blend are substantially identical. In such an aspect, the first polymer in the first polymer blend is substantially identical the third polymer in the second polymer blend, and the second polymer in the first polymer blend is substantially identical the fourth polymer in the second polymer blend, and the ratio of the first polymer relative to the second polymer in the first polymer blend is substantially identical to the ratio of the third polymer relative to the fourth polymer in the second polymer blend.

In one aspect, the first polymer blend and the second polymer blend are distinguishable from each other. The first polymer blend and the second polymer blend can be distinguishable by the polymers making up the first polymer blend and the second polymer blend or be distinguishable by the ratios of the polymers used to make the first polymer blend and the second polymer blend.

In one aspect, the first polymer blend comprises from about 1 wt % to about 99 wt % of the first polymer and from about 99 wt % to about 1 wt % of the second polymer. For example, the first polymer blend can comprise from about 5 wt % to about 99 wt % of the first polymer and from about 95 wt % to about 1 wt % of the second polymer. In another example, the first polymer blend can comprise from about 10 wt % to about 99 wt % of the first polymer and from about 90 wt % to about 1 wt % of the second polymer. In yet another example, the first polymer blend can comprise from about 20 wt % to about 99 wt % of the first polymer and from about 80 wt % to about 1 wt % of the second polymer. In yet another example, the first polymer blend can comprise from about 30 wt % to about 99 wt % of the first polymer and from about 70 wt % to about 1 wt % of the second polymer. In yet another example, the first polymer blend can comprise from about 40 wt % to about 99 wt % of the first polymer and from about 60 wt % to about 1 wt % of the second polymer. In yet another example, the first polymer blend can comprise from about 50 wt % to about 99 wt % of the first polymer and from about 50 wt % to about 1 wt % of the second polymer. In yet another example, the first polymer blend can comprise from about 60 wt % to about 99 wt % of the first polymer and from about 40 wt % to about 1 wt % of the second polymer. In yet another example, the first polymer blend can comprise from about 70 wt % to about 99 wt % of the first polymer and from about 30 wt % to about 1 wt % of the second polymer. In yet another example, the first polymer blend can comprise from about 80 wt % to about 99 wt % of the first polymer and from about 20 wt % to about 1 wt % of the second polymer.

In another example, the first polymer blend can comprise from about 1 wt % to about 95 wt % of the first polymer and from about 99 wt % to about 5 wt % of the second polymer. In another example, the first polymer blend can comprise from about 1 wt % to about 90 wt % of the first polymer and from about 99 wt % to about 10 wt % of the second polymer. In yet another example, the first polymer blend can comprise from about 1 wt % to about 80 wt % of the first polymer and from about 99 wt % to about 20 wt % of the second polymer. In yet another example, the first polymer blend can comprise from about 1 wt % to about 70 wt % of the first polymer and from about 99 wt % to about 30 wt % of the second polymer. In yet another example, the first polymer blend can comprise from about 1 wt % to about 60 wt % of the first polymer and from about 99 wt % to about 40 wt % of the second polymer. In yet another example, the first polymer blend can comprise from about 1 wt % to about 50 wt % of the first polymer and from about 99 wt % to about 50 wt % of the second polymer. In yet another example, the first polymer blend can comprise from about 1 wt % to about 40 wt % of the first polymer and from about 99 wt % to about 60 wt % of the second polymer. In yet another example, the first polymer blend can comprise from about 1 wt % to about 30 wt % of the first polymer and from about 99 wt % to about 70 wt % of the second polymer. In yet another example, the first polymer blend can comprise from about 1 wt % to about 20 wt % of the first polymer and from about 99 wt % to about 80 wt % of the second polymer. In yet another aspect, the first polymer blend can comprise from about 5 wt % to about 50 wt % of the first polymer and from about 95 wt % to about 50 wt % of the second polymer. In yet another aspect, the first polymer blend can comprise from about 20 wt % to about 30 wt % of the first polymer and from about 80 wt % to about 70 wt % of the second polymer.

In one aspect, the second polymer blend comprises from about 1 wt % to about 99 wt % of the third polymer and from about 99 wt % to about 1 wt % of the fourth polymer. For example, the second polymer blend can comprise from about 5 wt % to about 99 wt % of the third polymer and from about 95 wt % to about 1 wt % of the fourth polymer. In another example, the second polymer blend can comprise from about 10 wt % to about 99 wt % of the third polymer and from about 90 wt % to about 1 wt % of the fourth polymer. In yet another example, the second polymer blend can comprise from about 20 wt % to about 99 wt % of the third polymer and from about 80 wt % to about 1 wt % of the fourth polymer. In yet another example, the second polymer blend can comprise from about 30 wt % to about 99 wt % of the third polymer and from about 70 wt % to about 1 wt % of the fourth polymer. In yet another example, the second polymer blend can comprise from about 40 wt % to about 99 wt % of the third polymer and from about 60 wt % to about 1 wt % of the fourth polymer. In yet another example, the second polymer blend can comprise from about 50 wt % to about 99 wt % of the third polymer and from about 50 wt % to about 1 wt % of the fourth polymer. In yet another example, the second polymer blend can comprise from about 60 wt % to about 99 wt % of the third polymer and from about 40 wt % to about 1 wt % of the fourth polymer. In yet another example, the second polymer blend can comprise from about 70 wt % to about 99 wt % of the third polymer and from about 30 wt % to about 1 wt % of the fourth polymer. In yet another example, the second polymer blend can comprise from about 80 wt % to about 99 wt % of the third polymer and from about 20 wt % to about 1 wt % of the fourth polymer.

In another example, the second polymer blend can comprise from about 1 wt % to about 95 wt % of the third polymer and from about 99 wt % to about 5 wt % of the fourth polymer. In another example, the second polymer blend can comprise from about 1 wt % to about 90 wt % of the third polymer and from about 99 wt % to about 10 wt % of the fourth polymer. In yet another example, the second polymer blend can comprise from about 1 wt % to about 80 wt % of the third polymer and from about 99 wt % to about 20 wt % of the fourth polymer. In yet another example, the second polymer blend can comprise from about 1 wt % to about 70 wt % of the third polymer and from about 99 wt % to about 30 wt % of the fourth polymer. In yet another example, the second polymer blend can comprise from about 1 wt % to about 60 wt % of the third polymer and from about 99 wt % to about 40 wt % of the fourth polymer. In yet another example, the second polymer blend can comprise from about 1 wt % to about 50 wt % of the third polymer and from about 99 wt % to about 50 wt % of the fourth polymer. In yet another example, the second polymer blend can comprise from about 1 wt % to about 40 wt % of the third polymer and from about 99 wt % to about 60 wt % of the fourth polymer. In yet another example, the second polymer blend can comprise from about 1 wt % to about 30 wt % of the third polymer and from about 99 wt % to about 70 wt % of the fourth polymer. In yet another example, the second polymer blend can comprise from about 1 wt % to about 20 wt % of the third polymer and from about 99 wt % to about 80 wt % of the fourth polymer. In yet another aspect, the second polymer blend can comprise from about 5 wt % to about 50 wt % of the third polymer and from about 95 wt % to about 50 wt % of the fourth polymer. In yet another aspect, the second polymer blend can comprise from about 20 wt % to about 30 wt % of the third polymer and from about 80 wt % to about 70 wt % of the fourth polymer.

In one aspect, the continuous or non-continuous first polymer film can comprise two or more alternating layers of the first polymer and the second polymer. For example, the continuous or non-continuous first polymer film can comprise 10 or more alternating layers of the first polymer and the second polymer. In another example, the continuous or non-continuous first polymer film can comprise 100 or more alternating layers of the first polymer and the second polymer. In yet another example, the continuous or non-continuous first polymer film can comprise 1,000 or more alternating layers of the first polymer and the second polymer. In yet another example, the continuous or non-continuous first polymer film can comprise 5,000 or more alternating layers of the first polymer and the second polymer. Alternating layers of the first and second polymer can be done by a multiplication process where a layer of the first polymer and the second polymer are folded multiple times to create multiply alternating layers of the first polymer and the second polymer in the first polymer blend.

In one aspect, the continuous or non-continuous first polymer film can comprise filaments of the first polymer within a continuous phase of the second polymer. For example, the filaments of the first polymer can be randomly oriented within the continuous phase of the second polymer. In another example, the filaments of the first polymer can be ordered within the continuous phase of the second polymer. In another examples, the filaments of the first polymer can be substantially evenly distributed within the continuous phase of the second polymer. In such as aspect, an extrusion process operated under a constant polymer output can be used such that a preset amount of the first polymer and the second polymer are extruded at constant conditions such that the first polymer can be substantially evenly distributed within the continuous phase of the second polymer.

In one aspect, the continuous or non-continuous first polymer film can comprise filaments of the second polymer within a continuous phase of the first polymer. For example, the filaments of the second polymer can be randomly oriented within the continuous phase of the first polymer. In another example, the filaments of the second polymer can be ordered within the continuous phase of the first polymer. In another examples, the filaments of the second polymer can be substantially evenly distributed within the continuous phase of the first polymer. In such as aspect, an extrusion process operated under a constant polymer output can be used such that a preset amount of the first polymer and the second polymer are extruded at constant conditions such that the second polymer can be substantially evenly distributed within the continuous phase of the first polymer.

In one aspect, the continuous or non-continuous second polymer film can comprise two or more alternating layers of the third polymer and the fourth polymer. For example, the continuous or non-continuous second polymer film can comprise 10 or more alternating layers of the third polymer and the fourth polymer. In another example, the continuous or non-continuous second polymer film can comprise 100 or more alternating layers of the third polymer and the fourth polymer. In yet another example, the continuous or non-continuous second polymer film can comprise 1,000 or more alternating layers of the third polymer and the fourth polymer. In yet another example, the continuous or non-continuous second polymer film can comprise 5,000 or more alternating layers of the third polymer and the fourth polymer. Alternating layers of the third and fourth polymer can be done by a multiplication process where a layer of the third polymer and the fourth polymer are folded multiple times to create multiply alternating layers of the third polymer and the fourth polymer in the third polymer blend.

In one aspect, the continuous or non-continuous second polymer film can comprise filaments of the third polymer within a continuous phase of the fourth polymer. For example, the filaments of the third polymer can be randomly oriented within the continuous phase of the fourth polymer. In another example, the filaments of the third polymer can be ordered within the continuous phase of the fourth polymer. In another examples, the filaments of the third polymer can be substantially evenly distributed within the continuous phase of the fourth polymer. In such as aspect, an extrusion process operated under a constant polymer output can be used such that a preset amount of the third polymer and the fourth polymer are extruded at constant conditions such that the third polymer can be substantially evenly distributed within the continuous phase of the fourth polymer.

In one aspect, the continuous or non-continuous second polymer film can comprise filaments of the fourth polymer within a continuous phase of the third polymer. For example, the filaments of the fourth polymer can be randomly oriented within the continuous phase of the third polymer. In another example, the filaments of the fourth polymer can be ordered within the continuous phase of the third polymer. In another examples, the filaments of the fourth polymer can be substantially evenly distributed within the continuous phase of the third polymer. In such as aspect, an extrusion process operated under a constant polymer output can be used such that a preset amount of the third polymer and the fourth polymer are extruded at constant conditions such that the fourth polymer can be substantially evenly distributed within the continuous phase of the third polymer.

In one aspect, the continuous or non-continuous first polymer film can have a thickness from about 25 µm to about 500 µm. For example, the continuous or non-continuous first polymer film can have a thickness from about 50 µm to about 400 µm. In another example, the continuous or non-continuous first polymer film can have a thickness from about 100 µm to about 200 µm. In another example, the continuous or non-continuous first polymer film can have a thickness from about 75 µm to about 300 µm.

In one aspect, the continuous or non-continuous second polymer film can have a thickness from about 25 µm to about 500 µm. For example, the continuous or non-continuous second polymer film can have a thickness from about 50 µm to about 400 µm. In another example, the continuous or non-continuous second polymer film can have a thickness from about 100 µm to about 200 µm. In another example, the continuous or non-continuous second polymer film can have a thickness from about 75 µm to about 300 µm.

In one aspect, the first polymer is a polyester, a polyamide, or a polystyrene, or a combination thereof. For example, the first polymer can be a polyester. In such an example, the polyester can be polyethylene terephthalate. In another example, the first polymer can be a polyamide. In such an example, the polyamide can be selected from the group consisting of polyamide 6, polyamide 11, polyamide 12, copolymers thereof, and a blend thereof. In yet another example, the first polymer can be a polystyrene.

In one aspect, the second polymer can be a polyolefin. In such an aspect, the polyolefin can be selected from the group consisting of polyethylene, polypropylene, polybutylene, copolymers thereof, and a blend thereof. For example, the second polymer can be polyethylene. In another example, the second polymer can be polypropylene. In yet another example, the second polymer can be polybutylene.

In one aspect, the first polymer can be polyethylene terephthalate and the second polymer can be polypropylene. In one aspect, the first polymer can be polystyrene and the second polymer can be polypropylene.

In one aspect, the third polymer is a polyester, a polyamide, or a polystyrene, or a combination thereof. For example, the third polymer can be a polyester. In such an example, the polyester can be polyethylene terephthalate. In another example, the third polymer can be a polyamide. In such an example, the polyamide can be selected from the group consisting of polyamide 6, polyamide 11, polyamide 12, copolymers thereof, and a blend thereof. In yet another example, the third polymer can be a polystyrene.

In one aspect, the fourth polymer can be a polyolefin. In such an aspect, the polyolefin can be selected from the group consisting of polyethylene, polypropylene, polybutylene, copolymers thereof, and a blend thereof. For example, the fourth polymer can be polyethylene. In another example, the fourth polymer can be polypropylene. In yet another example, the fourth polymer can be polybutylene.

In one aspect, the third polymer can be polyethylene terephthalate and the fourth polymer can be polypropylene. In one aspect, the third polymer can be polystyrene and the fourth polymer can be polypropylene.

In one aspect, the first non-woven fabric comprises a spunbond non-woven material. In another aspect, the first non-woven fabric comprises stable fibers. Spunbond non-woven material is available from a number of commercial sources including 3M, Avgol, and Berry Global. In one aspect, the first non-woven fabric has a weight from about 10 gsm to about 40 gsm.

In one aspect, the second non-woven fabric comprises a spunbond non-woven material. In another aspect, the second non-woven fabric comprises stable fibers. In one aspect, the second non-woven fabric has a weight from about 10 gsm to about 40 gsm.

B. Carpet Compositions

The present invention further provides carpet compositions comprising the composite disclosed and described above. In some aspects, the carpet composition generally comprises the composite as a primary backing component. In other aspects, the composite can be present as a secondary backing component. The carpet composition can be a tufted carpet or a non-tufted carpet such as needle punched carpet. To form the tufted carpet, yarn is tufted through the primary backing component such that the longer length of each stitch extends through the face surface of the primary backing component. The primary backing component can be any composite as described herein.

It has been found that the carpet compositions described herein can be made to have satisfactory properties when the carpet composition comprises a composite as disclosed herein.

Examples of yarn tufted into the composites disclosed herein are shown in FIGS. 1A-1B and 2A-2B.

In one aspect, disclosed herein is a carpet composition comprising a primary backing material, wherein the primary backing material can be the composite disclosed herein.

In one aspect, disclosed herein is a carpet composition comprising a secondary backing material, wherein the secondary backing material can be the composite disclosed herein.

In one aspect, disclosed herein is a carpet composition comprising a primary backing material and a secondary backing material, wherein the primary backing material can be the composite disclosed herein, and the secondary backing material can be the composite disclosed herein.

In one aspect, disclosed herein is a greige good comprising a) a primary backing material having a face side and a back side, wherein the primary backing material is a composite disclosed herein; and b) a plurality of fibers attached to the primary backing material, at least a portion of said plurality of fibers extending from the face side of the primary backing material to form a face pile. In one aspect, the greige good further comprises a precoat composition applied to the back side of the primary backing material; and a secondary backing material having a face side and a back side, wherein the face side of the secondary backing material is adjacent to the precoat composition. For example, the secondary backing material can be the composite disclosed herein. In another aspect, the secondary backing is not the composite disclosed herein. In a further aspect, a polymer film applied to the back side of the secondary backing material.

In one aspect, disclosed herein is a greige good comprising a) a primary backing material having a face side and a back side; and b) a plurality of fibers attached to the primary backing material, at least a portion of said plurality of fibers extending from the face side of the primary backing material to form a face pile; c) precoat composition applied to the back side of the primary backing material; and d) a secondary backing material having a face side and a back side, wherein the face side of the secondary backing material is adjacent to the precoat composition, and wherein the secondary backing material is a composite disclosed herein. In one aspect, the primary backing material is not a composite disclosed herein. In a further aspect, a polymer film applied to the back side of the secondary backing material.

In one aspect, disclosed herein is a greige good comprising: a) a primary backing material having a face side and a back side, wherein the primary backing material comprises: i) a continuous or a non-continuous first polymer film having a face side and a back side, wherein the first polymer film comprises a first polymer blend comprising a first polymer and a second polymer, wherein the first polymer is immiscible in the second polymer; and ii) a continuous or a non-continuous second polymer film having a face side and a back side, wherein the second polymer film comprises a second polymer blend comprising a third polymer and a fourth polymer, wherein the third polymer is immiscible in the fourth polymer, wherein the face side of the second polymer film contacts the back side of the first polymer film; wherein first polymer film is an extruded film and the second polymer film is an extruded film, wherein the first polymer film and the second polymer film are extruded in a transverse direction, and b) a plurality of fibers attached to the primary backing material, at least a portion of said plurality of fibers extending from the face side of the primary backing material to form a face pile. In one aspect, the greige good can further comprise c) precoat composition applied to the back side of the primary backing material; and d) a secondary backing material having a face side and a back side, wherein the face side of the secondary backing material is adjacent to the precoat composition. In yet another aspect, the greige good can further comprise e) a polymer film applied to the back side of the secondary backing material.

In certain aspect, the primary backing material is not a composite primary backing material, when the secondary backing is a composite disclosed herein. In those aspects, the primary backing component comprises a polyolefin, a polyester, a polyamide, or a combination thereof. The primary backing component can be woven and non-woven. In certain aspects, the primary backing component can comprise non-woven webs, or spunbonded materials. In some aspects, the primary backing component can comprise a combination of woven and non-woven materials. In some aspects, the primary backing component comprises a polyolefin polymer. In other aspects, the polyolefin polymer comprises polypropylene. In yet other aspects, the primary backing component is a slit film polypropylene sheet such as that sold by Propex or Synthetic Industries owned by Shaw Industries. In yet further aspects, the primary backing component can comprise polyester. In still further aspect, the primary backing component can comprise polyamide. In yet further aspects, the primary backing component can comprise a combination of polyamide and polyester. In the certain aspects, the polyamide is nylon. In some other aspects, the primary backing can comprise a woven polyethylene terephthalate (PET). In yet other aspects, the primary backing can comprise a woven PET having a post-consumer and/or post-industrial content.

In certain aspects, the primary backing component is a spun-bond primary backing component. The spun bond backing can be produced by depositing extruded, spun filaments onto a collecting belt in a uniform random manner followed by bonding the fibers. The fibers are separated during the web laying process by air jets or electrostatic charges. The collecting surface is usually perforated to prevent the air stream from deflecting and carrying the fibers in an uncontrolled manner. Bonding imparts strength and integrity to the web by applying heated rolls or hot needles to partially melt the polymer and fuse the fibers together. Since molecular orientation increases the melting point, fibers that are not highly drawn can be used as thermal binding fibers. In some aspect, the spun-bond primary backing component can comprise a bi-component filament of a sheath-core type. In some aspects, the polymeric core component can have a higher melting point than the polymeric sheath component. In some aspects, the polymeric core component can comprise polyester, aliphatic polyamides, polyphenylene oxide and/or co-polymers or blends thereof. In yet other aspects, the polyester can comprise polyethylene terephthalate, polybutylene terephthalate, or polyparaphenylene terephthalamide. In yet other aspects, the polymeric core comprises polyethylene terephthalate. In further aspects, the sheath polymer can comprise a polyamide, polyethylene, or polyester. In yet further aspects, the sheath polymer comprises nylon. In still further aspects, the sheath-core primary backing component comprises a polyester as a core component and nylon as a sheath component. The exemplary sheath-core primary backing component can be commercially available from Bonar. In yet other aspects, a polyester non-woven primary backing can be commercially available from Freudenberg.

In some aspects, the plurality of fibers are present in yarn. In other aspects, the plurality of fibers are present as separate fibers. In some aspects, the plurality of fibers form tufts. In some aspects, a portion of the plurality of the fibers is exposed at the back surface of the primary backing component. In yet other aspects, a portion of the plurality of the fibers are exposed at the back surface of the primary backing component in a form of back stitches.

In some aspects, the plurality of fibers can comprise a polyamide, an olefin, or a polyester. The term "polyamide," as utilized herein, is defined to be any long-chain polymer in which the linking functional groups are amide (—CO—NH—) linkages. The term polyamide is further defined to include copolymers, terpolymers and the like as well as homopolymers and also includes blends of two or more polyamides. In some aspects, the plurality of polyamide fibers comprise one or more of nylon 6, nylon 66, nylon 10, nylon 612, nylon 12, nylon 11, or any combination thereof. In other aspects, the plurality of polyamide fibers comprise nylon 6 or nylon 66. In yet other aspects, the plurality of polyamide fibers are nylon 6. In a yet further aspect, the plurality of polyamide fibers are nylon 66.

In certain aspects, the plurality of fibers comprise a polyester. The term "polyester fiber" as utilized herein, refers to the manufactured fiber in which the fiber forming substance is any long-chain synthetic polymer composed of at least 85% by weight of an ester of a substituted aromatic carboxylic acid, including but not restricted to substituted terephthalic units, $p(-R-O-CO-C_6H_4-CO-O-)_x$ and parasubstituted hydroxy-benzoate units, $p(-R-O-CO-C_6H_4-O-)_x$. In some aspects, the plurality of the polyester fibers comprise polyethylene terephthalate (PET) homopolymers and copolymers, polybutylene terephthalate (PBT) homopolymers and copolymers, and the like, including those that contain comonomers such as cyclohexanedimethanol, cyclohexanedicarboxylic acid, and the like.

In yet further aspects, the plurality of fibers can comprise a polyolefin fiber. As defined herein, the term "polyolefin" refers to any class of polymers produced from a simple olefin (also called an alkene with the general formula $C_nH_{2n}$) as a monomer. In some aspects, the polyolefins which can be used to produce the yarn and fibers include, but are not limited to, polyethylene, polypropylene, both homopolymer and copolymers, poly(I-butene), poly(3-methyl-1-butene), poly(4-methyl-1-pentene) and the like, as well as combinations or mixtures of two or more of the foregoing. In certain aspects, the plurality of the polyolefin fibers comprise polyethylene or polypropylene. In other aspects, the plurality of the polyolefin fibers comprise polyethylene. In yet other aspects, the plurality of the polyolefin fibers comprise polypropylene.

In yet further aspect, the plurality of fibers can further comprise natural fibers, acrylics, viscose, rayon, cellulose acetate, linen, silk, cotton, wool, or any combination thereof.

As understood by one of ordinary skill in the art, the plurality of fibers can comprise any types of fibers. For example, and without limitation, the plurality of fibers can comprise staple fibers or bulked continuous filament fibers.

In one aspect, the greige good can further comprise a precoat layer applied to the back surface of the composite primary backing component. The precoat layer can be used to enhance tuft bind and lock the plurality of fibers or tufts in place. In some aspects, the precoat layer can provide additional strength to the tufts (so-called tuft bind strength). In yet other aspects, the precoat layer can be used to substantially prevent any subsequent applications of an optional adhesive composition from penetrating through (the openings between) the plurality of fibers (the tufts) in the direction of the carpet top face.

In some aspects, the precoat layer comprises the aqueous precoat material. In some exemplary aspects, the aqueous precoat material can, for example, be added as a dispersion or as an emulsion. Other aspects, an emulsion can be made from various polyolefin materials such as, for example and without limitation, ethylene acrylic acid (EAA), ethylene vinyl acetate (EVA), polypropylene or polyethylene (e.g., low density polyethylene (LDPE), linear low density polyethylene (LLDPE) or substantially linear ethylene polymer, or mixtures thereof). In some aspects, the precoat layer can comprise latex. It is further contemplated that the precoat material in the precoat layer can be selected from a group comprising, without limitation, an EVA hotmelt, a vinyl acetate ethylene (VAE) emulsion, carboxylated styrene-butadiene (XSB) latex copolymer, a styrene-butadiene resin (SBR) latex, a BDMMA latex, an acrylic latex, an acrylic copolymer, a styrene copolymer, butadiene acrylate copolymer, a polyolefin hotmelt, polyurethane, polyolefin dispersions and/or emulsions, and any combination thereof.

In certain aspects, the precoat layer can further comprise one or more flame retardants. Exemplary flame retardants that can be incorporated into the precoat layer include, without limitation, organo-phosphorous flame retardants, red phosphorous magnesium hydroxide, magnesium dihydroxide, hexabromocyclododecane, bromine containing flame retardants, brominated aromatic flame retardants, melamine cyanurate, melamine polyphosphate, melamine borate, methylol and its derivatives, silicon dioxide, calcium carbonate, resourcinol bis-(diphenyl phosphate), brominated latex base, antimony trioxide, strontium borate, strontium phosphate, monomeric N-alkoxy hindered amine (NOR HAS), triazine and its derivatives, high aspect ratio talc, phosphated esters, organically modified nanoclays and nanotubes, non-organically modified nanoclays and nanotubes, ammonium polyphosphate, polyphosphoric acid, ammonium salt, friaryl phosphates, isopropylated triphenyl phosphate, phosphate esters, magnesium hydroxide, zinc borate, bentonite (alkaline activated nanoclay and nanotubes), organoclays, aluminum trihydrate (ATH), azodicarbonamide, diazenedicarboxamide, azodicarbonic acid diamide (ADC), friaryl phosphates, isopropylated triphenyl phosphate, triazine derivatives, alkaline activated organoclay and aluminum oxide. Any desired amount of flame retardant can be used in the precoat layer and the selection of such amount will depend on a required carpet application. Such amounts can be readily determined through no more than routine experimentation.

In still a further aspect, the precoat layer can further contain other ingredients. For example, a surfactant can be included. Suitable surfactants can include, for example and without limitation, nonionic, anionic, cationic and fluorosurfactants. In one aspect, the surfactant is present in an amount between about 0.01 and about 5 weight percent based on the total weight of the emulsion or dispersion. In another aspect, the surfactant is anionic. In a further aspect, the surfactant is cationic. In a yet further aspect, the surfactant is nonionic. In a still further aspect, the surfactant is a fluorosurfactant.

In another aspect, the precoat layer can further comprise a thickener, a defoaming agent, and/or a dispersion enhancer. In this aspect, the thickener helps to provide a suitable viscosity to the dispersion. For example, the thickener can exemplarily comprise sodium and ammonium salts of polyacrylic acids and best present in an amount between about 0.1 and about 5 weight percent based on the total weight of the dispersion. The defoaming agent can, without limitation, be a non-silicone defoaming agent and is present in an amount between about 0.01 and about 5.0 weight percent based on the total weight of the dispersion. An exemplified dispersion enhancer can be a fumed silica that acts as a compatibilizer for the dispersion. In some aspects, the fumed silica is present at between about 0.1 and about 0.2 weight percent based on the total weight of the dispersion.

In still another aspect, the precoat layer can comprise one or more fillers. Exemplary and non-limiting fillers that can be incorporated into the precoat layer can include calcium carbonate, fly-ash, recycled calcium carbonate, aluminum trihydrate, talc, nano-clay, barium sulfate, barite, barite glass fiber, glass powder, glass cullet, metal powder, alumina, hydrated alumina, clay, magnesium carbonate, calcium sulfate, silica, glass, fumed silica, carbon black, graphite, cement dust, feldspar, nepheline, magnesium oxide, zinc oxide, aluminum silicate, calcium silicate, titanium dioxide, titanates, glass microspheres, chalk, calcium oxide, and any combination thereof. In some aspects, the filler can comprise about calcium carbonate and alumina trihydrate. Calcium carbonate and alumina trihydrate can be present in any ratio suitable for a specific carpet application, for example and without limitation, calcium carbonate and alumina trihydrate can be present in a ratio of about 100:1 parts, about 100:2 parts, about 100:3 parts, about 100:4 parts, about 100:5 parts, about 100:6 parts, about 100:7 parts, about 100:8 parts, about 100:9 parts, or about 100:10 parts of calcium carbonate to alumina trihydrate.

Figure 3:
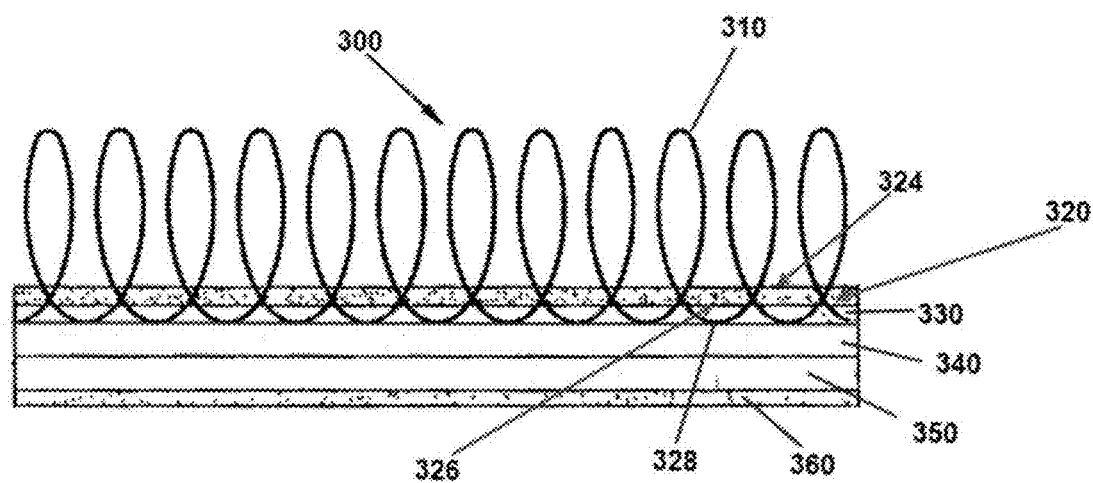
FIG. 3 shows a non-limiting example of a carpet composition disclosed herein.

In some aspects, the carpet composition described herein can further comprise an optional secondary backing system applied to a back surface of the primary backing or optional precoat layer when present. The secondary backing system can comprise one or more of an adhesive layer, a secondary backing, a reinforcing material, and any combination thereof. In one aspect, the composite disclosed herein is the secondary backing. An exemplary carpet composition comprising a secondary backing system is depicted in FIG. 3. Specifically, FIG. 3 demonstrates an exemplary carpet composition 300 disclosed herein. A plurality of fibers 310 present in yarns are attached to or tufted into a primary backing component 320 and extend from the face surface 324 of the primary backing component. In one aspect, the primary backing component 320 is a composite disclosed herein. A portion of the plurality of fibers is exposed at a back surface 326 of the primary backing component in the form of back stitches 328. An optional precoat layer 330 can be applied to the back surface of the primary backing component and the back stiches. An optional adhesive composition 340 is further applied to the precoat layer. A secondary backing material 360 is disposed on an optional reinforcing material 350. As disclosed herein, the secondary backing material 360 can be the composite disclosed herein. Also as disclosed herein, the secondary backing material 360 can be a conventional secondary backing material. At least one of the primary backing component 320 and the secondary backing component 360 is the composite disclosed herein. In some aspects, the layer of the reinforcing material 350 can be embedded between a precoated greige goods and secondary backing material. The layer of reinforcing material has been found to enhance the dimensional stability of the carpet composition. Suitable reinforcing materials include dimensionally and thermally stable fabrics such as non-woven or wet-laid fiberglass scrims, as well as woven and non-woven thermoplastic fabrics (e.g. polypropylene, nylon and polyester). In some aspects, the reinforcement layer is a fiberglass scrim, for example, Duraglass that is commercially available from Johns Manville (about 2.0 oz/square yard). Alternatively, in other aspects, a reinforcement layer is a fiberglass scrim sold by Owens Corning (about 2.0 oz/square yard).

In some aspects, the secondary backing material, when a conventional secondary backing material, can comprise a thermoplastic polyolefin. In certain aspects, the secondary backing material comprises substantially linear ethylene polymers and homogeneously branched linear ethylene polymers (i.e., homogeneously branched ethylene polymers). Homogeneously branched ethylene polymers (including substantially linear ethylene polymers in particular) have low solidification temperatures, good adhesion to polypropylene, and low modulus relative to conventional ethylene polymers such as low density polyethylene (LDPE), heterogeneously branched linear low density polyethylene (LLDPE), high density polyethylene (HDPE), and heterogeneously branched ultra low density polyethylene (ULDPE).

In some aspects, when properly selected substantially linear ethylene polymers or homogeneously branched linear ethylene polymers are used as the secondary backing materials, the low flexural modulus of these polymers offers advantages in ease of carpet installation and general carpet handling. Substantially linear ethylene polymers, in particular, when employed as a secondary backing material show enhanced mechanical adhesion to polypropylene which improves the consolidation and delamination resistance of the various carpet layers and components, i.e., polypropylene fibers, fiber bundles, the primary backing component. In some aspects, good abrasion resistance is especially important in commercial carpet cleaning operations as good abrasion resistance generally improves carpet durability.

In certain aspects, the secondary backing material comprising a substantially linear ethylene polymer or homogeneously branched linear ethylene polymer can provide a substantial fluid and particle barrier which enhances the hygienic properties of carpet.

In some further aspects, use of the secondary backing material comprising a substantially linear ethylene polymer or homogeneously branched linear ethylene polymer can allow totally recyclable carpet products particularly where the carpet comprises polypropylene fibers.

The secondary backing material can comprise a homogeneously branched ethylene polymer. The homogeneously branched ethylene polymer can have a single melting peak between −30° C. and 150° C., as determined using differential scanning calorimetry. In some aspects, the homogeneously branched ethylene polymer used in the secondary backing material of this invention, is a substantially linear ethylene polymer characterized as having (a) a melt flow ratio, $I_{10}/I_2 > 5.63$; (b) a molecular weight distribution, $M_w/M_n$, as determined by gel permeation chromatography and defined by the equation: $(M_w/M_n) < (I_{10}/I_2) - 4.63$, (c) a gas extrusion rheology such that the critical shear rate at onset of surface melt fracture for the substantially linear ethylene polymer is at least 50 percent greater than the critical shear rate at the onset of surface melt fracture for a linear ethylene polymer, wherein the linear ethylene polymer has a homogeneously branched short chain branching distribution and no long chain branching, and wherein the substantially linear ethylene polymer and the linear ethylene polymer are simultaneously ethylene homopolymers or interpolymers of ethylene and at least one $C_3$-$C_{20}$ a-olefin and have the same $I_2$ and $M_w/M_n$, and wherein the respective critical shear rates of the substantially linear ethylene polymer and the linear ethylene polymer are measured at the same melt temperature using a gas extrusion rheometer; and (d) a single differential scanning calorimetry, DSC, melting peak between −30° and 150° C.

Determination of the critical shear rate in regards to melt fracture as well as other rheology properties such as "rheological processing index" (PI), is performed using a gas extrusion rheometer (GER). The gas extrusion rheometer is described by M. Shida, R. N. Shroff and L. V. Cancio in *Polymer Engineering Science*, Vol. 17, No. 11, p. 770 (1977), and in "Rheometers for Molten Plastics" by John Dealy, published by VanNostrand Reinhold Co. (1982) on pp. 97-99, the disclosures of both of which are incorporated herein by reference. GER experiments are performed at a temperature of 190° C., at nitrogen pressures between about 250 and about 5500 psig (about 1.7 and about 37.4 MPa) using a 0.0754 mm diameter, 20:1 L/D die with an entrance angle of about 180°. For the substantially linear ethylene polymers used herein, the PI is the apparent viscosity (in kpoise) of a material measured by GER at an apparent shear stress of $2.15 \times 10^6$ dyne/-$cm^2$ ($2.19 \times 10^4$ kg/$m^2$). In certain aspects, the secondary backing material can comprise the substantially linear ethylene polymer having a PI in the range of 0.01 kpoise to 50 kpoise, 15 kpoise or less. The substantially linear ethylene polymers used herein also have a PI less than or equal to 70 percent of the PI of a linear ethylene polymer (either a Ziegler polymerized polymer or a homogeneously branched linear polymer as described by Elston in U.S. Pat. No. 3,645,992) having an $I_2$ and $M_w/M_n$, each within ten percent of the substantially linear ethylene polymer.

In some aspects, the homogeneously branched ethylene polymers used in the present invention can be characterized by a single DSC melting peak. The single melting peak is determined using a differential scanning calorimeter standardized with indium and deionized water. The method involves 5-7 mg sample sizes, a "first heat" to about 140° C. which is held for 4 minutes, a cool down at 10°/min to −30° C. which is held for 3 minutes, and heat up at 10° C./min to 150° C. for the "second heat". The single melting peak is taken from the "second heat" heat flow vs. temperature curve. Total heat of fusion of the polymer is calculated from the area under the curve.

In a further aspect, for polymers having a density of about 0.875 g/cc to about 0.910 g/cc, the single melting peak may show, depending on equipment sensitivity, a "shoulder" or a "hump" on the low melting side that constitutes less than about 12 percent, typically, less than about 9 percent, and more typically less than about 6 percent of the total heat of fusion of the polymer. Such an artifact is observable for other homogeneously branched polymers such as Exact™ resins and is discerned on the basis of the slope of the single melting peak varying monotonically through the melting region of the artifact. Such an artifact occurs within 34° C., typically within 27° C., and more typically within 20° C. of the melting point of the single melting peak. The heat of fusion attributable to an artifact can be separately determined by specific integration of its associated area under the heat flow vs. temperature curve.

In certain aspects, the molecular weight distribution ($M_w/M_n$) for the substantially linear ethylene polymers and homogeneous linear ethylene polymers used in the present invention is generally from about 1.8 to about 2.8. Substantially linear ethylene polymers are known to have excellent processability, despite having a relatively narrow molecular weight distribution. Unlike homogeneously and heterogeneously branched linear ethylene polymers, the melt flow ratio ($I_{10}/I_2$) of substantially linear ethylene polymers can be varied essentially independently of their molecular weight distribution, $M_w/M_n$.

In some aspects, the secondary backing material comprising homogeneously branched ethylene polymers includes interpolymers of ethylene and at least one α-olefin prepared by a solution, gas phase, or slurry polymerization process, or combinations thereof. In some aspects the α-olefins are represented by the following formula:

$$CH_2=CHR$$

where R is a hydrocarbyl radical. Further, R may be a hydro-carbyl radical having from one to twenty carbon atoms and as such the formula includes $C_3$-$C_{20}$ α-olefins. In other aspects, α-olefins for use as comonomers include propylene, 1-butene, 1-isobutylene, 1-pentene, 1-hexene, 4-methyl-1-pentene, 1-heptene and 1-octene, as well as other comonomer types such as styrene, halo- or alkyl-substituted styrenes, tetrafluoro-ethylene, vinyl benzocyclobutene, 1,4-hexadiene, 1,7-octadiene, and cycloalkenes, e.g., cyclopentene, cyclo-hexene and cyclooctene. In certain aspects, the comonomer will be 1-butene, 1-pentene, 4-methyl-1-pentene, 1-hexene, 1-heptene, 1-octene, or mixtures thereof, as secondary backing materials comprised of higher α-olefins will have especially improved toughness. In yet other aspects, the comonomer will be 1-octene and the ethylene polymer will be prepared in a solution process.

In certain aspects, the density of the substantially linear ethylene polymer or homogeneously branched linear ethylene polymer, as measured in accordance with ASTM D-792, does not exceed about 0.92 g/cc, and is generally in the range from about 0.85 g/cc to about 0.92 g/cc, from about 0.86 g/cc to about 0.91 g/cc, and from about 0.86 g/cc to about 0.90 g/cc.

In yet further aspects, the molecular weight of the homogeneously branched linear ethylene polymer or substantially linear ethylene polymer can be characterized using a melt index measurement according to ASTM D-1238, Condition 190° C./2.16 kg (formerly known as "Condition (E)" and also known as $I_2$). Melt index is inversely proportional to the molecular weight of the polymer. Thus, the higher the molecular weight, the lower the melt index, although the relationship is not linear. The melt index for the homogeneously branched linear ethylene polymer or substantially linear ethylene polymer is generally from about 1 grams/10 minutes (g/10 min) to about 500 g/10 min, about 2 g/10 min to about 300 g/10 min, from about 5 g/10 min to about 100 g/10 min, from about 10 g/10 min to about 50 g/10 min, and about 25 to about 35 g/10 min.

In some other aspects, an additional measurement can be useful in characterizing the molecular weight of the homogeneous linear ethylene polymer or the substantially linear ethylene polymer and can be performed using a melt index measurement according to ASTM D-1238, Condition 190° C./10 kg (formerly known as "Condition (N)" and also known as $I_{10}$). The ratio of the $I_{10}$ and the $I_2$ melt index terms is the melt flow ratio and is designated as $I_{10}/I_2$. For the substantially linear ethylene polymer, the $I_{10}/I_2$ ratio indicates the degree of long chain branching, i.e., the higher the $I_{10}/I_2$ ratio, the more long chain branching in the polymer. The $I_{10}/I_2$ ratio of the substantially linear ethylene polymer is at least about 6.5, at least about 7, or at least about 8. The $I_{10}/I_2$ ratio of the homogeneously branched linear ethylene polymer is generally less than about 6.3.

In some aspects, the ethylene polymers can have a relative low modulus. That is, the ethylene polymer is characterized as having a 2% secant modulus less than about 24,000 psi (163.3 MPa), less than about 19,000 psi (129.3 MPa), and less than about 14,000 psi (95.2 MPa), as measured in accordance with ASTM D790.

In certain aspects, the ethylene polymers described herein are substantially amorphous or totally amorphous. That is, the ethylene polymer is characterized as having a percent crystallinity less than about 40 percent, less than about 30 percent, more less than about 20, and less than about 10 percent, as measured by differential scanning calorimetry using the equation:

percent crystallinity %=($H_f$/292)×100, where $H_f$ is the heat of fusion in Joules/gram.

In other aspects, the homogeneously branched ethylene polymer (HBEP) can be used alone or can be blended or mixed with one or more synthetic or natural polymeric material. In some aspects, the polymers for blending or mixing with homogeneously branched ethylene polymers used in the present invention include, but are not limited to, another homogeneously branched ethylene polymer, low density polyethylene, heterogeneously branched LLDPE, heterogeneously branched ULDPE, medium density polyethylene, high density polyethylene, grafted polyethylene (e.g. a maleic anhydride extrusion grafted heterogeneously branched linear low polyethylene or a maleic anhydride extrusion grafted homogeneously branched ultra low density polyethylene), ethylene acrylic acid copolymer, ethylene vinyl acetate copolymer, ethylene ethyl acrylate copolymer, polystyrene, polypropylene, polyester, polyurethane, polybutylene, polyamide, polycarbonate, rubbers, ethylene propylene polymers, ethylene styrene polymers, styrene block copolymers, and vulcanates.

In further aspects, the secondary backing material can comprise a blend of at least two polyethylenes, wherein the polyethylene can comprise a homogeneously branched ethylene polymer (HBEP) or a substantially linear ethylene polymer (SLEP), or mixtures thereof. In other aspects, the secondary backing material can comprise a blend of at least three or four, or more polyethylenes, wherein the polyethylenes comprise a homogeneously branched ethylene polymer (HBEP) or a substantially linear ethylene polymer (SLEP), or mixtures thereof. Still further, the secondary backing material can comprise a polyethylene comprising at least about 80% by weight of at least one (or two or more) HBEP or SLEP as measured by weight of the polyethylene, including exemplary values of about 85, 90, 95, 97, 98, or about 99% by weight of the polyethylene, where any value can comprise an upper or a lower endpoint, as appropriate.

In the aspects, where the blend of at least two (or three or more) polyethylenes is used, the amount of each polyethylene can be individually varied in the amounts of, for example, from about 1, 5, 10, 15, 20, 25, 30, 35, 40, 45, 50, 55, 60, 65, 70, 75, 80, 85, 90, 95, 97 or about 98% by weight of the total blend, where any value can be used for the individual components, and any value can be used as an upper or a lower endpoint, as appropriate.

The density of the polyethylene components in the blend can be about 0.860, 0.870, 0.880, 0.885, 0.890, 0.895, 0.900, 0.905, or about 0.910 g/cc. Further, the density can be in a range derived from the above values where any above value can comprise an upper or a lower endpoint, as appropriate.

The actual blending or mixing of various polymers may be conveniently accomplished by any technique known in the art including, but not limited to, melt extrusion compounding, dry blending, roll milling, melt mixing such as in a Banbury mixer and multiple reactor polymerization. In some aspects, the blends or mixtures include a homogeneously branched ethylene polymer and a heterogeneously branched ethylene α-olefin interpolymer, wherein the α-olefin is a $C_3$-$C_8$ α-olefin prepared using two reactors operated in parallel or in series with different catalyst systems employed in each reactor.

In another aspect, the secondary backing material can comprise a modified homogeneously branched ethylene polymer. In particular, in certain aspects of the invention the at least one homogeneously branched ethylene polymer that can be present within the secondary backing material can be modified by the addition of at least one adhesive polymeric additive. Suitable adhesive polymeric additives include, for example and without limitation, polymer products comprised of (1) one or more ethylenically unsaturated carboxylic acids, anhydrides, alkyl esters and half esters, e.g., acrylic acid, methacrylic acid, maleic acid, maleic anhydride, itaconic acid, fumaric acid, crotonic acid and citraconic acid, citraconic anhydride, succinnic acid, succinnic anhydride, methyl hydrogen maleate, and ethyl hydrogen maleate; esters of ethylenically unsaturated carboxylic acids, e.g., ethyl acrylate, methyl methacrylate, ethyl methacrylate, methyl acrylate, isobutyl acrylate, and methyl fumarate; unsaturated esters of carboxylic acids, e.g., vinyl acetate, vinyl propionate, and vinyl benzoate; and ethylenically unsaturated amides and nitriles e.g., acrylamide, acrylonitrile, methacrylonitrile and fumaronitrile; and (2) one or more ethylenically unsaturated hydrocarbon monomers such as aliphatic α-olefin monomers, e.g., ethylene, propylene, butene-1 and isobutene; conjugated dienes, e.g., butadiene and isoprene; and monovinylidene aromatic carbocyclic monomers, e.g., styrene, α-methylstyrene, toluene, and t-butylstyrene.

A modified homogeneously branched ethylene polymer for use in the secondary backing materials can be conveniently prepared by known techniques such as, for example, by interpolymerization or by a polymerization procedure followed by a chemical or extrusion grafting procedure. Suitable grafting techniques are described in U.S. Pat. Nos. 4,762,890; 4,927,888; 4,230,830; 3,873,643; and 3,882,194, the disclosures of all of which are incorporated herein by reference.

In some aspects, the adhesive polymeric additives for use in the present invention can include maleic anhydride grafts wherein maleic anhydride is grafted onto an ethylene polymer at a concentration of about 0.1 to about 5.0 weight percent, about 0.5 to about 1.5 weight percent. The presence of ethylene polymer/maleic anhydride grafts as adhesive polymeric additives in the present invention can improve the performance and operating window of extrusion coated homogeneously branched ethylene polymers as the secondary backing material, especially when used in connection with polar polymers such as for example, but is not limited to, nylon and polyester faced carpets. The improvement pertained to substantially higher comparative abrasion resistance and tuft bind strength. In an exemplary aspect, a composition for forming a maleic anhydride graft is the Amplify® GR 204 available from Dow Chemicals.

In further aspects, the ethylene polymers for use as the grafted host polymer include low density polyethylene (LDPE), high density polyethylene (HDPE), heterogeneously branched linear low density polyethylene (LLDPE), homogeneously branched linear ethylene polymers and substantially linear ethylene polymers. In some aspects, the host ethylene polymers have a polymer density greater than or equal to about 0.86 g/cc, 0.87 g/cc, 0.88 g/cc, 0.89 g/cc, 0.90 g/cc, 0.91 g/cc, 0.92 g/cc, 0.93 g/cc, or greater than or equal to about 0.94 g/cc. In yet other aspects, the substantially linear ethylene polymers and high density polyethylene are utilized as host ethylene polymers.

In some aspects, it is contemplated that the secondary backing material to be extruded or applied by any other technique known in the art. In some aspects, the secondary backing material of this invention may optionally include exemplary additives such as foaming agents, pH controllers, flame retardants, fillers, tackifiers, wetting agents, dispersing agents, anti-microbial agents, lubricants, dyes, anti-oxidants, and the like, which are well known to those skilled in the art, without loss of the characteristic properties.

In one aspect, the secondary backing material can further comprise one or more flame retardants sufficient to ensure the carpet structure satisfies the requirements of the radiant flux floor covering test according to the ASTM-E648 testing procedures. In particular, according to certain aspects, the carpet compositions of the present invention exhibit a Class 1 critical radiant flux of greater than 0.45 watts per $cm^2$ as measured according to ASTM-E648. According to other aspects of the invention, the carpet compositions described herein can exhibit a Class 2 critical radiant flux in the range of from 0.22 to 0.44 watts per $cm^2$ as measured according to ASTM-E648. In still further aspects, the carpet compositions of the present invention can exhibit an unclassifiable critical radiant flux of less than 0.22 watts per $cm^2$ as measured according to ASTM-E648.

Exemplary flame retardants that can be incorporated into the secondary backing materials of the present invention include, without limitation, organo-phosphorous flame retardants, red phosphorous magnesium hydroxide, magnesium dihydroxide, hexabromocyclododecane, bromine containing flame retardants, brominated aromatic flame retardants, melamine cyanurate, melamine polyphosphate, melamine borate, methylol and its derivatives, silicon dioxide, calcium carbonate, resourcinol bis-(diphenyl phosphate), brominated latex base, antimony trioxide, strontium borate, strontium phosphate, monomeric N-alkoxy hindered amine (NOR HAS), triazine and its derivatives, high aspect ratio talc, phosphated esters, organically modified nanoclays and nanotubes, non-organically modified nanoclays and nanotubes, ammonium polyphosphate, polyphosphoric acid, ammonium salt, friaryl phosphates, isopropylated triphenyl phosphate, phosphate esters, magnesium hydroxide, zinc borate, bentonite (alkaline activated nanoclay and nanotubes), organoclays, aluminum trihydrate (ATH), azodicarbonamide, diazenedicarboxamide, azodicarbonic acid diamide (ADC), friaryl phosphates, isopropylated triphenyl phosphate, triazine derivatives, alkaline activated organoclay and aluminum oxide. Any desired amount of flame retardant can be used in the secondary backing material of the instant invention and the selection of such amount will depend, in part, upon the particular flame retardant used and desired carpet applications. Such amounts can be readily determined through no more than routine experimentation.

Exemplary and non-limiting fillers that can be incorporated into the secondary backing materials of the present invention can include calcium carbonate, fly-ash, recycled calcium carbonate, aluminum trihydrate, talc, nano-clay, barium sulfate, barite, barite glass fiber, glass powder, glass cullet, metal powder, alumina, hydrated alumina, clay, magnesium carbonate, calcium sulfate, silica, glass, fumed silica, carbon black, graphite, cement dust, feldspar, nepheline, magnesium oxide, zinc oxide, aluminum silicate, calcium silicate, titanium dioxide, titanates, glass microspheres, chalk, calcium oxide, and any combination thereof. In one aspect, the secondary backing material comprises inorganic filler with high heat content. In some aspects, it is for the filler to exhibit relatively high heat content. Examples of such fillers include, but are not limited to, calcium carbonate, aluminum trihydrate, talc, and barite. The exemplified high heat content fillers allow the extrudate to remain at elevated temperatures longer with the beneficial result of providing enhanced encapsulation and penetration. In this aspect, the high heat content fillers should be ground or precipitated to a size that can be conveniently incorporated in an extrusion coating melt stream. Exemplary non-limiting particle sizes for the inorganic filler material can include particle sizes in the range of from about 1 to about 50 microns. Still further, it should also be understood that the filler component can be present in any desired amount. However, in an exemplary aspect, the filler is present in an amount in the range of from about 10 weight % to about 90 weight %, based upon the total weight of the secondary backing material, including exemplary amounts of about 15 weight %, 20 weight %, 25 weight %, 30 weight %, 35 weight %, 40 weight %, 45 weight %, 50 weight %, 55 weight %, 60 weight %, 65 weight %, 70 weight %, 75 weight %, 80 weight %, and about 85 weight %. Still further, the amount of filler present can be in any range derived from any two of the above stated weight percentages.

In still another aspect, the secondary backing material can further comprise one or more tackifying additives. The tackifier can for example be tall oil or rosin based or, alternatively, can be an aliphatic or aliphatic aromatic hydrocarbon blend resin. As the tackifier is an optional component, the amount of tackifier can be, when present, in the range of from greater than 0 weight percent up to and even exceeding about 50 weight % of the secondary backing material. For example, in one aspect, the amount of tackifier can be in the range of from about 5 weight % to about 45 weight %. In still another aspect, the amount of tackifier can be in the range of from about 10 weight % to about 20 weight %.

In other aspects, the carpet compositions can further comprise additional backings. In some aspects, the additional backing can comprise woven materials. In yet other aspects, the backings can comprise a tape-tape yarn, or a tape-spun yarn. In certain aspects, the additional backing materials are tape-tape yarn woven materials. In certain exemplary aspects, the material for additional backings can be a conventional material, for example and without limitation, the woven polypropylene fabric sold by Propex. Such backings can comprise a material that is a leno weave with polypropylene tape running in one direction and polypropylene spun yarn running in the other. In other aspects, the backing material that can be used with the present invention is a woven polypropylene fabric with monofilaments running in both directions. A suitable example of such a material is manufactured by Shaw Industries, Inc. under the designation Style S8880. In further aspects, the additional backing material is a material known as fiber lock weave or "FLW." FLW is a fabric which includes fibers needle punched into it. Sometimes FLW is used as a primary backing component on a carpet with a low pile weight. In some aspects, the additional backing can be a woven needle punched polypropylene fabric such as SoftBac® manufactured by Shaw Industries, Inc. In this exemplary aspect, this material has been enhanced by having about 1.5 ounce/sq. yard of polypropylene fibers or polyethylene terephthalate fibers needle punched onto one side of it and has a total basis weight of about 3.5 ounce/sq. yard. This needle punched fabric can be laminated so as to have the polypropylene fibers embedded within the backing layer. In still further aspects other materials can be used for the additional backing, for example, and without limitation, if an integral pad is desired, a polyurethane foam or other cushion material can be laminated to the back side of the carpet. Such backings can be used for broadloom carpet.

In certain aspects, the carpet composition disclosed herein comprises a carpet tile, a broadloom carpet, an area rug, or a synthetic turf. In yet other aspects, the carpet composition disclosed herein is a carpet tile, a broadloom carpet, an area rug, or a synthetic turf.

C. Methods of Making a Composite and a Carpet Composition

In one aspect, disclosed herein is a method of making the composite disclosed herein.

In one aspect, disclosed is a method of making a composite comprising the step of laminating: a) a continuous or a non-continuous first polymer film having a face side and a back side, wherein the first polymer film comprises a first polymer blend comprising a first polymer and a second polymer, wherein the first polymer is immiscible in the second polymer; b) a first non-woven fabric having a face side and a back side, wherein the face side of the first non-woven fabric contacts the back side of the first polymer film; c) a continuous or a non-continuous second polymer film having a face side and a back side, wherein the second polymer film comprises a second polymer blend comprising a third polymer and a fourth polymer, wherein the third polymer is immiscible in the fourth polymer, wherein the face side of the second polymer film contacts the back side of the first non-woven fabric; and d) a second non-woven fabric having a face side and a back side, wherein the face side of the second non-woven fabric contacts the back side of the second polymer film, thereby making the composite. In one aspect, the composite is a composite disclosed herein.

In one aspect, the step of laminating can be done in a single step. Accordingly, the continuous or the non-continuous first polymer film, the first non-woven fabric, the continuous or the non-continuous second polymer film, and the second non-woven fabric are simultaneously introduced in an apparatus that performs the laminating of the continuous or the non-continuous first polymer film, the first non-woven fabric, the continuous or the non-continuous second polymer film, and the second non-woven fabric in a single step.

In one aspect, the step of laminating can be done in multiple laminating steps. For example, the continuous or the non-continuous first polymer film and the first non-woven fabric can be laminated in one step, and the continuous or the non-continuous second polymer film, and the second non-woven fabric can be laminated in a separate step. The laminated first polymer film and first non-woven fabric can then be laminated with the laminated second polymer film and second non-woven fabric.

In still further aspects, disclosed herein are methods of making carpet compositions comprising the inventive composite.

The face of a tufted carpet can generally be made in three ways. First, for loop pile carpet, the yarn loops formed in the tufting process are left intact. Second, for cut pile carpet, the yarn loops are cut, either during tufting or after, to produce a pile of single yarn ends instead of loops. Third, some carpet styles include both loop and cut pile. One variety of this hybrid is referred to as tip-sheared carpet where loops of differing lengths are tufted followed by shearing the carpet at a height so as to produce a mix of uncut, partially cut, and completely cut loops. Alternatively, the tufting machine can be configured so as to cut only some of the loops, thereby leaving a pattern of cut and uncut loops. Whether loop, cut, or a hybrid, the yarn on the back surface of the primary backing component comprises tight, unextended loops. The combination of tufted yarn and a primary backing component without the application of an adhesive backing material or secondary backing material is referred to in the carpet industry as raw tufted carpet or greige goods. Greige goods become finished tufted carpet with the application of secondary backing materials or any other additional backings if present to the back surface of the primary backing material. In the aspects of the current invention, the greige goods become finished tufted carpet with the application of the secondary backing material. Finished tufted carpet can be prepared as tiles or as broad-loomed carpet in rolls typically 6 or 12 feet wide. In some other aspects, broadloom carpet can be prepared in rolls 13'6" and 15' feet wide.

In another aspect, any conventional tufting or needle-punching apparatus and/or stitch patterns can be used to make the carpet compositions of the present invention. Likewise, it does not matter whether tufted yarn loops are left uncut to produce a loop pile; cut to make cut pile; or cut, partially cut and uncut to make a face texture known as tip sheared. After the yarn is tufted or needle-punched into the primary backing component, the greige good can be conventionally rolled up with the back surface of the primary backing component facing outward and held until it is transferred to the backing line.

The optional precoat composition can be applied as a precoat composition layer to the carpet composition in various ways. For example, the precoat can be applied directly, such as with a roll over roller applicator, or a doctor blade. Alternatively, the precoat composition can be applied indirectly, such as with a pan applicator. It is contemplated that the amount of precoat applied and the concentration of the particles in the precoat can be varied depending on the desired processing and product parameters. In some aspects, the precoat composition layer is present in the carpet composition an amount of about 17 ounces/sq. yard or less, about 16 ounces/sq. yard or less, about 15 ounces/sq. yard or less, about 14 ounces/sq. yard or less, about 13 ounces/sq. yard or less, or about 12 ounces/sq. yard or less.

After application of the precoat composition layer, heat can be applied to the back side of the primary backing so as to dry, melt, and/or cure the composition. As a result, the loops of yarn can be at least partially fixed to the primary backing. Preferably, the heat is applied by passing the product through an oven.

After treatment with the optional precoat composition, additional backing material can be applied thereto. The additional backings can be applied by various methods with the preferred method involving the use of an extruded sheet of a thermoplastic material. In some aspects, a molten thermoplastic material is extruded through a die so as to make a sheet which is as wide as the carpet composition. The molten, extruded sheet is applied to the back side of the primary carpet backing. Since the sheet is molten, the sheet will conform to the shape of the loops of yarn and further serve to encapsulate and fix the loops in the primary backing.

Exemplary extrusion coating configurations can include, without limitation, a monolayer T-type die, single-lip die coextrusion coating, dual-lip die coextrusion coating, a coat hanger die, and multiple stage extrusion coating. Preferably, the extrusion coating equipment is configured to apply a total coating weight of from about 4 to about 60 ounces/yd$^2$ (OSY), including exemplary amounts of 5, 10, 15, 20, 25, 30, 35, 40, 45, 50 and 55 ounces/yd$^2$ (OSY), and any range of coating weights derived from these values. To that end, it should be understood that the desired coating weight of the extrusion coated layers will depend, at least in part, upon the amount of any flame retardants or inorganic fillers in the extrudate.

The extrusion coating melt temperature principally depends on the particular composition of the backing composition being extruded. When using the secondary backing composition describe herein is extruded, the extrusion coating melt temperature can be greater than about 350° F. and, in some aspects, in the range of from 350° F. to 650° F. In another aspect, the melt temperature can be in the range of from 375° F. to 600° F. Alternatively, the melt temperature can be in the range of from 400° F. to 550° F.

D. Aspects

In view of the described composite and carpet compositions and methods and variations thereof, herein below are described certain more particularly described aspects of the inventions. These particularly recited aspects should not however be interpreted to have any limiting effect on any different claims containing different or more general teachings described herein, or that the "particular" aspects are somehow limited in some way other than the inherent meanings of the language literally used therein.

Aspect 1: A composite comprising: (a) a continuous or a non-continuous first polymer film having a face side and a back side, wherein the first polymer film comprises a first polymer blend comprising a first polymer and a second polymer, wherein the first polymer is immiscible in the second polymer; (b) a first non-woven fabric having a face side and a back side, wherein the face side of the first non-woven fabric contacts the back side of the first polymer film; (c) a continuous or a non-continuous second polymer film having a face side and a back side, wherein the second polymer film comprises a second polymer blend comprising a third polymer and a fourth polymer, wherein the third polymer is immiscible in the fourth polymer, wherein the face side of the second polymer film contacts the back side of the first non-woven fabric; and (d) a second non-woven fabric having a face side and a back side, wherein the face side of the second non-woven fabric contacts the back side of the second polymer film.

Aspect 2: A composite comprising: (a) a continuous or a non-continuous first polymer film having a face side and a back side, wherein the first polymer film comprises a first polymer blend comprising a first polymer and a second polymer, wherein the first polymer is immiscible in the second polymer; (b) a first non-woven fabric having a face side and a back side; c) a continuous or a non-continuous second polymer film having a face side and a back side, wherein the second polymer film comprises a second polymer blend comprising a third polymer and a fourth polymer, wherein the third polymer is immiscible in the fourth polymer; and d) a second non-woven fabric having a face side and a back side.

Aspect 3: The composite of aspect 2, wherein the face side of the second polymer film contacts the back side of the first polymer film.

Aspect 4: The composite of aspects 2 or 3, wherein the face side of the first polymer film contacts the back side of the first non-woven fabric.

Aspect 5: The composite of any one of aspects 2-4, wherein the face side of the second non-woven fabric contacts the back side of the first polymer film.

Aspect 6: The composite of any one of aspects 2-4, wherein the face side of the first non-woven fabric contacts the back side of the second non-woven fabric.

Aspect 7: The composite of aspect 3, wherein the face side of the first non-woven fabric contacts the back side of the second polymer film.

Aspect 8: The composite of aspects 3 or 7, wherein the face side of the second non-woven fabric contacts the back side of the first non-woven fabric.

Aspect 9: The composite of aspect 2, wherein the face side of the first non-woven fabric contacts the back side of the first polymer film.

Aspect 10: The composite of aspects 2 or 9, wherein the face side of the second non-woven fabric contacts the back side of the first non-woven fabric.

Aspect 11: The composite of any one of aspects 2 ort 9-10, wherein the face side of the second polymer film contacts the back side of the second non-woven fabric.

Aspect 12: The composite of aspect 2, wherein the face side of the first polymer film contacts the back side of the first non-woven fabric.

Aspect 13: The composite of aspects 2 or 12, wherein the face side of the second non-woven fabric contacts the back side of the first polymer film.

Aspect 14: The composite of any one of aspects 2, 12, or 13, wherein the face side of the second polymer film contacts the back side of the second non-woven fabric.

Aspect 15: A composite comprising: (a) a continuous or a non-continuous first polymer film having a face side and a back side, wherein the first polymer film comprises a first polymer blend comprising a first polymer and a second polymer, wherein the first polymer is immiscible in the second polymer; (b) a first non-woven fabric having a face side and a back side; c) a continuous or a non-continuous second polymer film having a face side and a back side, wherein the second polymer film comprises a second polymer blend comprising a third polymer and a fourth polymer, wherein the third polymer is immiscible in the fourth polymer.

Aspect 16: The composite of aspect 15, wherein the face side of the second polymer film contacts the back side of the first polymer film.

Aspect 17: The composite of aspects 15 or 16, wherein the face side of the first polymer film contacts the back side of the first non-woven fabric.

Aspect 18: The composite of aspects 15 or 16, wherein the face side of the first non-woven fabric contacts the back side of the second polymer film.

Aspect 19: The composite of aspect 15, wherein the face side of the first non-woven fabric contacts the back side of the first polymer film.

Aspect 20: The composite of aspects 15 or 19, wherein the face side of the second polymer film contacts the back side of the first non-woven fabric.

Aspect 21: The composite of any one of aspects 1-20, wherein the composite comprises a continuous first polymer film.

Aspect 22: The composite of any one of aspects 1-21, wherein the composite comprises a continuous second polymer film.

Aspect 23: The composite of any one of aspects 1-22, wherein the composite comprises a continuous first polymer film and a continuous second polymer film.

Aspect 24: The composite of any one of aspects 1-23, wherein the composite comprises a non-continuous first polymer film.

Aspect 25: The composite of any one of aspects 1-24, wherein the composite comprises a non-continuous second polymer film.

Aspect 26: The composite of any one of aspects 1-25, wherein the composite comprises a non-continuous first polymer film and a non-continuous second polymer film.

Aspect 27: The composite of any one of aspects 1-26, wherein the composite comprises a continuous first polymer film and a non-continuous second polymer film.

Aspect 28: The composite of any one of aspects 1-27, wherein the composite comprises a non-continuous first polymer film and a continuous second polymer film.

Aspect 29: The composite of any one of aspects 1-28, wherein the composite is a laminated composite.

Aspect 30: The composite of any one of aspects 1-29, wherein the first polymer film is an extruded film.

Aspect 31: The composite of any one of aspects 1-30, wherein the second polymer film is an extruded film.

Aspect 32: The composite of any one of aspects 1-31, wherein the first polymer film and the second polymer film are extruded in the same direction.

Aspect 33: The composite of any one of aspects 1-31, wherein the first polymer film and the second polymer film are extruded in transverse directions.

Aspect 34: The composite of any one of aspects 1-33, wherein the composite has a face side and a back side, wherein the face side of the composite is the face side of the first polymer film, and wherein the back side of the composite is the back side of the second non-woven fabric.

Aspect 35: The composite of any one of aspects 1-34, wherein the first polymer blend and the second polymer blend are substantially identical.

Aspect 36: The composite of any one of aspects 1-35, wherein the first polymer blend comprises from about 1 wt % to about 99 wt % of the first polymer and from about 99 wt % to about 1 wt % of the second polymer.

Aspect 37: The composite of any one of aspects 1-36, wherein the first polymer blend comprises from about 5 wt % to about 50 wt % of the first polymer and from about 95 wt % to about 50 wt % of the second polymer.

Aspect 38: The composite of any one of aspects 1-37, wherein the first polymer blend comprises from about 20 wt % to about 30 wt % of the first polymer and from about 80 wt % to about 70 wt % of the second polymer.

Aspect 39: The composite of any one of aspects 1-38, wherein the second polymer blend comprises from about 1 wt % to about 99 wt % of the third polymer and from about 99 wt % to about 1 wt % of the fourth polymer.

Aspect 40: The composite of any one of aspects 1-39, wherein the second polymer blend comprises from about 5 wt % to about 50 wt % of the third polymer and from about 95 wt % to about 50 wt % of the fourth polymer.

Aspect 41: The composite of any one of aspects 1-40, wherein the second polymer blend comprises from about 20 wt % to about 30 wt % of the third polymer and from about 80 wt % to about 70 wt % of the fourth polymer.

Aspect 42: The composite of any one of aspects 1-41, wherein the first polymer film comprises two or more alternating layers of the first polymer and the second polymer.

Aspect 43: The composite of any one of aspects 1-42, wherein the second polymer film comprises two or more alternating layers of the third polymer and the fourth polymer.

Aspect 44: The composite of any one of aspects 1-43, wherein the first polymer film comprises filaments of the first polymer within a continuous phase of the second polymer.

Aspect 45: The composite of any one of aspects 1-44, wherein the second polymer film comprises filaments of the third polymer within a continuous phase of the fourth polymer.

Aspect 46: The composite of any one of aspects 1-45, wherein the first polymer and the second polymer are substantially evenly distributed throughout first polymer film.

Aspect 47: The composite of any one of aspects 1-46, wherein the third polymer and the fourth polymer are substantially evenly distributed throughout second polymer film.

Aspect 48: The composite of any one of aspects 1-47, wherein the first polymer and the second polymer are substantially evenly distributed throughout first polymer film in a random pattern.

Aspect 49: The composite of any one of aspects 1-48, wherein the third polymer and the fourth polymer are substantially evenly distributed throughout second polymer film in a random pattern.

Aspect 50: The composite of any one of aspects 1-49, wherein the first polymer is a polyester, a polyamide, or a polystyrene, or a combination thereof.

Aspect 51: The composite of aspect 50, wherein the first polymer is a polyester, wherein the polyester is polyethylene terephthalate.

Aspect 52: The composite of aspect 50, wherein the first polymer is a polyamide, wherein the polyamide is selected from the group consisting of polyamide 6, polyamide 11, polyamide 12, copolymers thereof, and a blend thereof.

Aspect 53: The composite of any one of aspects 1-52, wherein the second polymer is a polyolefin.

Aspect 54: The composite of aspect 53, wherein the polyolefin is selected from the group consisting of polyethylene, polypropylene, polybutylenes, copolymers thereof, and a blend thereof.

Aspect 55: The composite of aspect 53, wherein the second polymer is a polyolefin, wherein the polyolefin is polypropylene.

Aspect 56: The composite of any one of aspects 1-55, wherein the first polymer is polyethylene terephthalate, and wherein the second polymer is polypropylene.

Aspect 57: The composite of any one of aspects 1-56, wherein the third polymer is a polyester, a polyamide, or a polystyrene, or a combination thereof.

Aspect 58: The composite of aspect 57, wherein the third polymer is a polyester, wherein the polyester is polyethylene terephthalate.

Aspect 59: The composite of aspect 57, wherein the third polymer is a polyamide, wherein the polyamide is selected from the group consisting of polyamide 6, polyamide 11, polyamide 12, and copolymers, and a blend thereof.

Aspect 60: The composite of any one of aspects 1-59, wherein the fourth polymer is a polyolefin.

Aspect 61: The composite of aspect 60, wherein the polyolefin is selected from the group consisting of polyethylene, polypropylene, polybutylenes and copolymers, and a blend thereof.

Aspect 62: The composite of aspect 60, wherein the fourth polymer is a polyolefin, wherein the polyolefin is polypropylene.

Aspect 63: The composite of any one of aspects 1-62, wherein the third polymer is polyethylene terephthalate, and wherein the fourth polymer is polypropylene.

Aspect 64: The composite of any one of aspects 1-63, wherein the first non-woven fabric comprises a spunbond non-woven material.

Aspect 65: The composite of any one of aspects 1-64, wherein the second non-woven fabric comprises a spunbond non-woven material.

Aspect 66: A carpet comprising a primary backing material, wherein the primary backing material is the composite of any one of aspects 1-65.

Aspect 67: A carpet comprising a secondary backing material, wherein the secondary backing material is the composite of any one of aspects 1-65.

Aspect 68: A greige good comprising: a) a primary backing material having a face side and a back side, wherein the primary backing material is the composite of any one of aspects 1-65; and b) a plurality of fibers attached to the primary backing material, at least a portion of said plurality of fibers extending from the face side of the primary backing material to form a face pile.

Aspect 69: The greige good of aspect 68, further comprising: c) precoat composition applied to the back side of the primary backing material; and d) a secondary backing material having a face side and a back side, wherein the face side of the secondary backing material is adjacent to the precoat composition.

Aspect 70: The greige good of aspect 69, further comprising: e) a polymer film applied to the back side of the secondary backing material.

Aspect 71: The greige good of aspects 69-70, wherein the secondary backing material is the composite of any one of aspects 1-46.

Aspect 72: A greige good comprising: a) a primary backing material having a face side and a back side; b) a plurality of fibers attached to the primary backing material, at least a portion of said plurality of fibers extending from the face side of the primary backing material to form a face pile; c) precoat composition applied to the back side of the primary backing material; and d) a secondary backing material having a face side and a back side, wherein the face side of the secondary backing material is adjacent to the precoat composition, and wherein the secondary backing material is the composite of any one of aspects 1-65.

Aspect 73: The greige good of aspect 72, further comprising: e) a polymer film applied to the back side of the secondary backing material.

Aspect 74: A method of making a composite comprising the step of laminating: a) a continuous or a non-continuous first polymer film having a face side and a back side, wherein the first polymer film comprises a first polymer blend comprising a first polymer and a second polymer, wherein the first polymer is immiscible in the second polymer; b) a first non-woven fabric having a face side and a back side, wherein the face side of the first non-woven fabric contacts the back side of the first polymer film; c) a continuous or a non-continuous second polymer film having a face side and a back side, wherein the second polymer film comprises a second polymer blend comprising a third polymer and a fourth polymer, wherein the third polymer is immiscible in the fourth polymer, wherein the face side of the second polymer film contacts the back side of the first non-woven fabric; and d) a second non-woven fabric having a face side and a back side, wherein the face side of the second non-woven fabric contacts the back side of the second polymer film, thereby making the composite.

Aspect 75: The method of aspect 74, wherein the composite is the composite of any one of aspects 1-65.

Aspect 76: A greige good comprising: a) a primary backing material having a face side and a back side, wherein the primary backing material comprises: i) a continuous or a non-continuous first polymer film having a face side and a back side, wherein the first polymer film comprises a first polymer blend comprising a first polymer and a second polymer, wherein the first polymer is immiscible in the second polymer; and ii) a continuous or a non-continuous second polymer film having a face side and a back side, wherein the second polymer film comprises a second polymer blend comprising a third polymer and a fourth polymer, wherein the third polymer is immiscible in the fourth polymer, wherein the face side of the second polymer film contacts the back side of the first polymer film; wherein first polymer film is an extruded film and the second polymer film is an extruded film, wherein the first polymer film and the second polymer film are extruded in a transverse direction, and b) a plurality of fibers attached to the primary backing material, at least a portion of said plurality of fibers extending from the face side of the primary backing material to form a face pile.

Aspect 77: The greige good of aspect 76, further comprising: c) precoat composition applied to the back side of the primary backing material; and d) a secondary backing material having a face side and a back side, wherein the face side of the secondary backing material is adjacent to the precoat composition.

Aspect 78: The greige good of aspect 77, further comprising: e) a polymer film applied to the back side of the secondary backing material.

Aspect 79: The greige good of any one of aspects 76-78, wherein the secondary backing material is the composite of any one of claims 1-65.

E. EXAMPLES

The following examples are put forth so as to provide those of ordinary skill in the art with a complete disclosure and description of how the compounds, compositions, articles, devices, and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

1. Example 1

The objective of this example is to demonstrate that tufting can be done using the disclosed composite, and, as such, demonstrate that the disclosed composite can function as a backing material, such as a primary backing material.

Figure 1B:
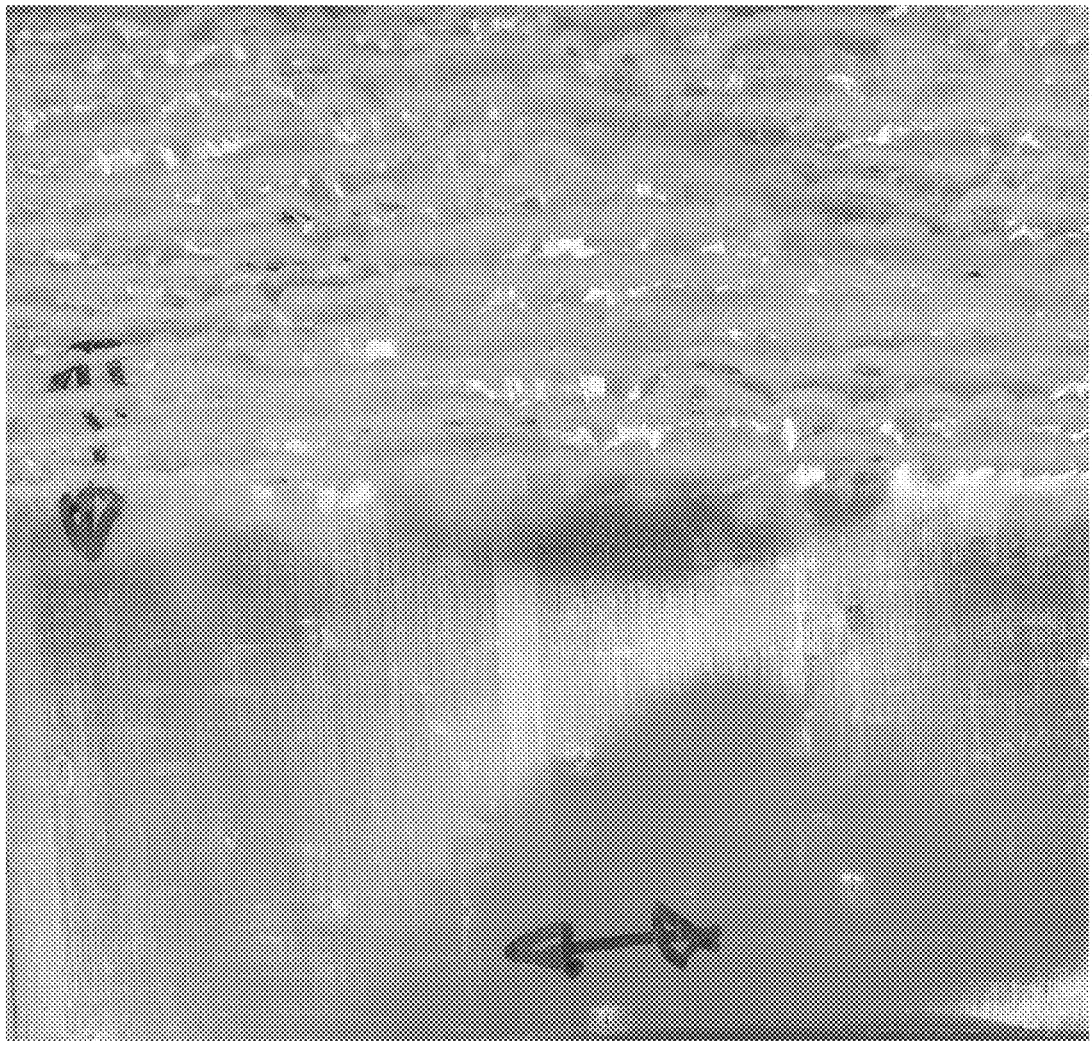

The data presented in FIGS. 1A-1B—demonstrates that a composite disclosed herein can function as a primary backing material in the carpet industry.

A continuous 160 μm thick polymer film was made from a blend of polypropylene (PP) and polyethylene terephthalate (PET) from PP/PET fiber film. The following four (4) samples were made as cast films, as follows: a) film made from 95 wt % PP and 5 wt % PET; b) film made from 75 wt % PP and 25 wt % PET; c) film made from 50 wt % PP and 50 wt % PET; and d) film made from 25 wt % PP and 75 wt % PET. A drawn film was also made from 75 wt % PP and 25 wt % PET at a draw ratio of 12× (in an instron set at 115° C.).

A two layer composite was made by laminating 2 layer of film perpendicular to each other.

Tufting was performed with the produced composites. The tufting machine was using cut pile, and the stitch rate was set to 10 stitches per inch, and the needle gauge was 5/32.

A woven fabric was used as a carrier for the test samples in the tufting process. A hole was cut out in the woven fabric, which hole was covered by the composite test samples. The test samples were attached to the woven material at the edges using backing tape.

The results from the tufting process can be seen in Table 1.

TABLE 1

| Type of Polymer Film used in Composite | Polymer Blend in Polymer Film | Successful Tufting |
|---|---|---|
| Cast #1 | 95 wt % PP and 5 wt % PET | No. Composite was damaged |
| Cast #2 | 50 wt % PP and 50 wt % PET | No. Composite was damaged |
| Cast #3 | 75 wt % PP and 25 wt % PET | Yes |
| Cast #4 | 25 wt % PP and 75 wt % PET | No. Composite was damaged |
| Drawn #1 | 75 wt % PP and 25 wt % PET | No. Composite was damaged |

Cast #3 was successfully tufted using a number of different cut piles. As such, cast #3 can be used as a primary backing material in the carpet industry. FIGS. 1A-1B and show pictures of cast #3 being tufted successfully.

2. Example 2

Stretched films in the machine direction (MDO) using a high content of PP and low content PET were produced and used to make composites. Such films are split when the tufting needles strike but the nonwoven prevents the slitting from uncontrollably propagating, thereby preventing the composite from being damaged during the tufting process. Thus, tufting was successfully performed in such composites. As such, a composite using the stretched films is suitable as a backing material, such as a primary backing material in the textile industry.

A film made from 95 wt % PP and 5 wt % PET was stretched at ratios of 5×, 6×, and 7× in the MDO and 1× (not stretched) in the transverse direction (TD) from an extrusion process. The stretching temperature for the films was set at 160° C.

The data associated with the stretched films are shown in Table 2.

TABLE 2

| Film Type | Draw Ratio (X) | Film Thickness (mil) | Tensile (PSI) @ peak | Elongation (%) @ peak |
|---|---|---|---|---|
| 95 wt % PP and 5 wt % PET | 5 | 1.91 | 24681 | 21.7 |
| 95 wt % PP and 5 wt % PET | 6 | 2.56 | 23101 | 37.8 |
| 95 wt % PP and 5 wt % PET | 7 | NA (too much splitting in film) | NA (too much splitting in film) | NA (too much splitting in film) |

A four layer composite was made by using two middle layers of the 5× and 6× stretched films described above with two outer layers of spunbond non-woven material (40 gsm spunbond) in a lamination process.

Tufting was performed with the produced composites. The tufting machine was using loop pile, and set to 9 stitches per inch, and the needle gauge was 5/32.

The results from the tufting process can be seen in Table 3.

TABLE 3

| Type of Polymer Film used in Composite | Polymer Blend in Polymer Film | Successful Tufting |
|---|---|---|
| Stretched 5× | 95 wt % PP and 5 wt % PET | Yes |
| Stretched 6× | 50 wt % PP and 50 wt % PET | Yes |

Figure 2A:
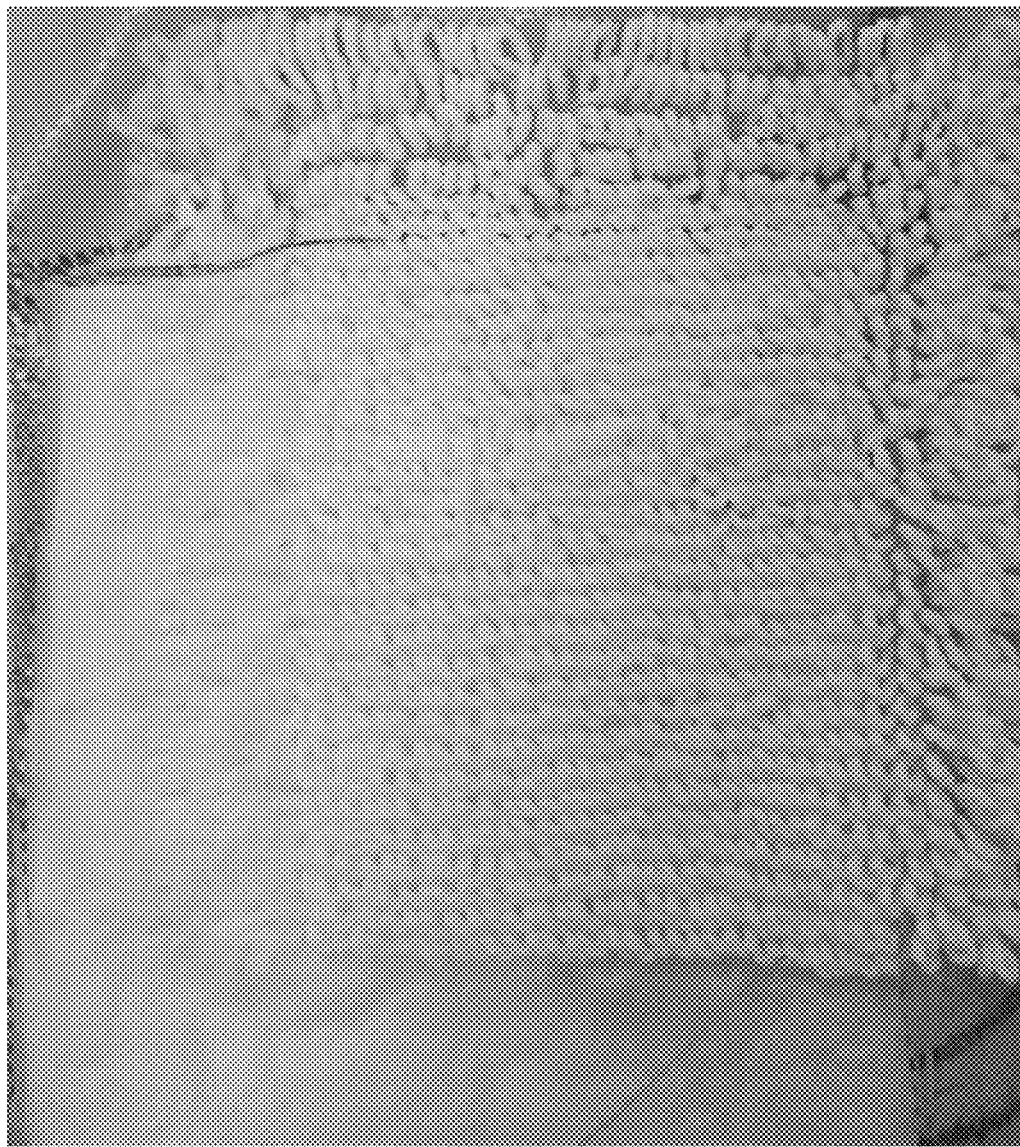
FIGS. 2A and 2B show yarn tufted into a non-limiting composite disclosed herein.
Figure 2B:
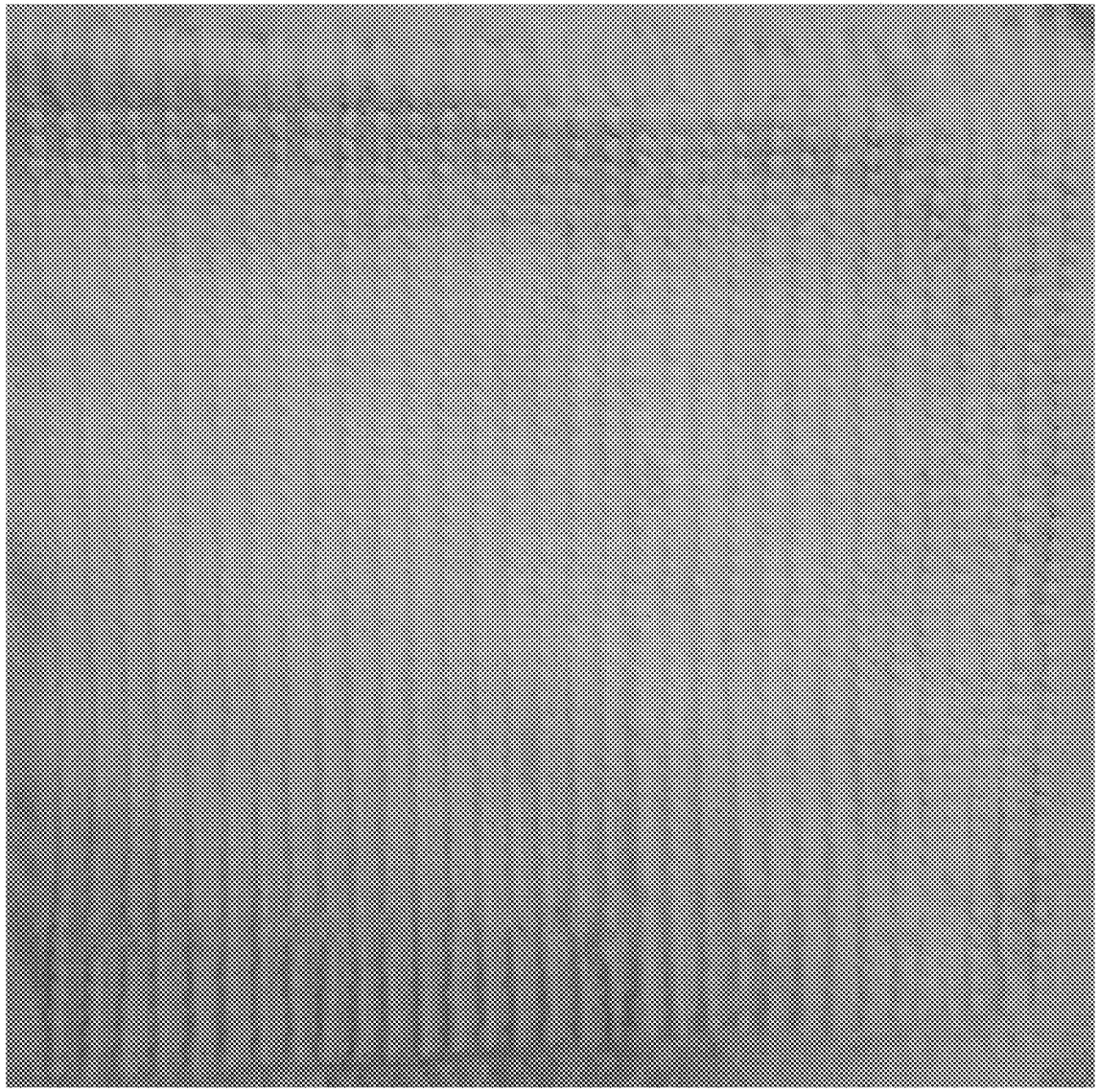

The composites using 5× and 6× stretched polymer films with a polymer blend of 95 wt % PP and 5 wt % PET provided for robust performance in the tufting process showing that the composite is suitable to be used as a backing material, such as a primary backing material in the textile industry. FIGS. 2A-2B and show pictures the composite using 6× stretched polymer films being tufted successfully. As such, this demonstrates the viability of a composite with stretched films of being used as a primary backing material in the carpet industry.

The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

While the preferred forms of the invention have been disclosed, it will be apparent to those skilled in the art that various changes and modifications may be made that will achieve some of the advantages of the invention without departing from the spirit and scope of the invention. Therefore, the scope of the invention is to be determined solely by the claims to be appended.

The invention claimed is:

1. A composite comprising:
   a. a continuous or a non-continuous first polymer film having a face side and a back side, wherein the first polymer film comprises a first polymer blend comprising a first polymer and a second polymer, wherein the first polymer is immiscible in the second polymer, wherein the first polymer film is stretched in a single stretching direction;
   b. a first non-woven fabric having a face side and a back side, wherein the face side of the first non-woven fabric contacts the back side of the first polymer film;
   c. a continuous or a non-continuous second polymer film having a face side and a back side, wherein the second polymer film comprises a second polymer blend comprising a third polymer and a fourth polymer, wherein the third polymer is immiscible in the fourth polymer, wherein the face side of the second polymer film contacts the back side of the first non-woven fabric, wherein the second polymer film is stretched in a single stretching direction; and
   d. a second non-woven fabric having a face side and a back side, wherein the face side of the second non-woven fabric contacts the back side of the second polymer film,
   wherein the composite comprises a machine direction and a cross direction; and
   i) wherein the single stretching direction of the first polymer film is arranged in the machine direction of the composite and the single stretching direction of the second polymer film is arranged in the cross direction of the composite; or
   ii) wherein the single stretching direction of the second polymer film is arranged in the machine direction of the composite and the single stretching direction of the first polymer film is arranged in the cross direction of the composite.

2. The composite of claim 1, wherein the composite comprises a continuous first polymer film and a continuous second polymer film.

3. The composite of claim 1, wherein the composite comprises a non-continuous first polymer film and a non-continuous second polymer film.

4. The composite of claim 1, wherein the composite is a laminated composite.

5. The composite of claim 1, wherein the first polymer blend comprises from about 20 wt % to about 30 wt % of the first polymer and from about 80 wt % to about 70 wt % of the second polymer.

6. The composite of claim 1, wherein the second polymer blend comprises from about 20 wt % to about 30 wt % of the third polymer and from about 80 wt % to about 70 wt % of the fourth polymer.

7. The composite of claim 1, wherein the first polymer film comprises two or more alternating layers of the first polymer and the second polymer.

8. The composite of claim 1, wherein the second polymer film comprises two or more alternating layers of the third polymer and the fourth polymer.

9. The composite of claim 1, wherein the first polymer film comprises filaments of the first polymer within a continuous phase of the second polymer.

10. The composite of claim 1, wherein the second polymer film comprises filaments of the third polymer within a continuous phase of the fourth polymer.

11. The composite of claim 1, wherein the first polymer is a polyester, a polyamide, or a polystyrene, or a combination thereof.

12. The composite of claim 1, wherein the second polymer is a polyolefin.

13. The composite of claim 1, wherein the first polymer is polyethylene terephthalate, and wherein the second polymer is polypropylene.

14. The composite of claim 1, wherein the third polymer is a polyester, a polyamide, or a polystyrene, or a combination thereof.

15. The composite of claim 1, wherein the fourth polymer is a polyolefin.

16. The composite of claim 1, wherein the third polymer is polyethylene terephthalate, and wherein the fourth polymer is polypropylene.

17. The composite of claim 1, wherein the first non-woven fabric comprises a spunbond non-woven material.

18. The composite of claim 1, wherein the second non-woven fabric comprises a spunbond non-woven material.

19. A composite comprising:
a. a continuous or a non-continuous first polymer film having a face side and a back side, wherein the first polymer film comprises a first polymer blend comprising a first polymer and a second polymer, wherein the first polymer is immiscible in the second polymer, wherein the first polymer film is stretched in a single stretching direction;
b. a first non-woven fabric having a face side and a back side; and
c. a continuous or a non-continuous second polymer film having a face side and a back side, wherein the second polymer film comprises a second polymer blend comprising a third polymer and a fourth polymer, wherein the third polymer is immiscible in the fourth polymer, wherein the second polymer film is stretched in a single stretching direction;
wherein the first non-woven fabric is arranged between the back side of the first polymer film and the face side of the second polymer film,
wherein the composite comprises a machine direction and a cross direction; and
  i) wherein the single stretching direction of the first polymer film is arranged in the machine direction of the composite and the single stretching direction of the second polymer film is arranged in the cross direction of the composite; or
  ii) wherein the single stretching direction of the first polymer film is arranged in the cross direction of the composite and the single stretching direction of the second polymer film is arranged in the machine direction of the composite.

20. A carpet comprising a primary backing material, wherein the primary backing material is the composite of claim 1.

21. A carpet comprising a secondary backing material, wherein the secondary backing material is the composite of claim 1.

22. A greige good comprising:
a. a primary backing material having a face side and a back side, wherein the primary backing material is the composite of claim 1; and
b. a plurality of fibers attached to the primary backing material, at least a portion of said plurality of fibers extending from the face side of the primary backing material to form a face pile.

23. A greige good comprising:
a. a primary backing material having a face side and a back side;
b. a plurality of fibers attached to the primary backing material, at least a portion of said plurality of fibers extending from the face side of the primary backing material to form a face pile;
c. precoat composition applied to the back side of the primary backing material; and
d. a secondary backing material having a face side and a back side, wherein the face side of the secondary backing material is adjacent to the precoat composition, and wherein the secondary backing material is the composite of claim 1.

24. A method of making the composite of claim 1 comprising the step of laminating:
a. a continuous or a non-continuous first polymer film having a face side and a back side, wherein the first polymer film comprises a first polymer blend comprising a first polymer and a second polymer, wherein the first polymer is immiscible in the second polymer, wherein the first polymer film is stretched in a single stretching direction;
b. a first non-woven fabric having a face side and a back side, wherein the face side of the first non-woven fabric contacts the back side of the first polymer film;
c. a continuous or a non-continuous second polymer film having a face side and a back side, wherein the second polymer film comprises a second polymer blend comprising a third polymer and a fourth polymer, wherein the third polymer is immiscible in the fourth polymer, wherein the face side of the second polymer film contacts the back side of the first non-woven fabric, wherein the second polymer film is stretched in a single stretching direction; and
d. a second non-woven fabric having a face side and a back side, wherein the face side of the second non-woven fabric contacts the back side of the second polymer film,
e. thereby making the composite,
wherein the composite comprises a machine direction and a cross direction; and
  i) wherein the single stretching direction of the first polymer film is arranged in the machine direction of the composite and the single stretching direction of the second polymer film is arranged in the cross direction of the composite; or
  ii) wherein the single stretching direction of the second polymer film is arranged in the machine direction of the composite and the single stretching direction of the first polymer film is arranged in the cross direction of the composite.

* * * * *